(12) United States Patent
Zhang

(10) Patent No.: US 12,579,731 B2
(45) Date of Patent: Mar. 17, 2026

(54) SUB-PIXEL CURVE RENDERING IN CONTENT GENERATION SYSTEMS AND APPLICATIONS

(71) Applicant: Nvidia Corporation, Santa Clara, CA (US)

(72) Inventor: Tianyi Zhang, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 122 days.

(21) Appl. No.: 18/505,278

(22) Filed: Nov. 9, 2023

(65) Prior Publication Data

US 2025/0157126 A1     May 15, 2025

(51) Int. Cl.
| | |
|---|---|
| *G06T 15/50* | (2011.01) |
| *G06T 7/13* | (2017.01) |
| *G06T 7/50* | (2017.01) |
| *G06T 7/60* | (2017.01) |
| *G06T 15/06* | (2011.01) |

(52) U.S. Cl.
CPC .............. G06T 15/06 (2013.01); G06T 7/13 (2017.01); G06T 7/50 (2017.01); G06T 7/60 (2013.01)

(58) Field of Classification Search
CPC .. G06T 15/06; G06T 7/13; G06T 7/50; G06T 7/60
USPC ......................................... 345/419
See application file for complete search history.

(56) References Cited

U.S. PATENT DOCUMENTS

| | | | | |
|---|---|---|---|---|
| 11,341,607 B2 * | 5/2022 | Mueller | ................ | G06T 3/4038 |
| | | | | 382/284 |
| 11,551,387 B2 * | 1/2023 | Uludag | .................. | G06T 15/40 |
| 2003/0214508 A1 * | 11/2003 | Aleksic | ................. | G06T 15/503 |
| | | | | 345/589 |
| 2005/0093890 A1 * | 5/2005 | Baudisch | ................. | G09G 5/14 |
| | | | | 345/639 |

FOREIGN PATENT DOCUMENTS

| | | | | |
|---|---|---|---|---|
| WO | WO-2022216333 A1 * | 10/2022 | ............... | G06T 5/50 |

OTHER PUBLICATIONS

Kim TY. Algorithms for Hardware Accelerated Hair Rendering. In The 30th International Conference on Computer Graphics and Interactive Techniques (SIGGRAPH 2003), San Diego, CA 2003. (Year: 2003) (Year: 2003).*

* cited by examiner

*Primary Examiner* — Temesghen Ghebretinsae
(74) *Attorney, Agent, or Firm* — Hogan Lovells US LLP

(57) ABSTRACT

Approaches presented herein provide for the generation of image content including fine objects, such as those that may be less than one pixel in width. Fine objects such as hairs can be represented by curve equations, and curves defined by these equations can be given an inflated width in order to perform conservative hit testing to efficiently identify pixels that a hair might intersect. Once candidate pixels are identified through ray tracing or sampling, for example, false positives or pixels with little hair representation can be removed from consideration. For remaining pixels, a linear representation of the inflated curve can be used to determine intersection points and vertices of a pixel quad corresponding to a hair, which can be used to generate a convex geometric shape representative of the object. The percentage of the pixel area occupied by this geometric shape can be used to determine an alpha or blending value for blending the pixel value of this hair or object with the background pixel color.

20 Claims, 18 Drawing Sheets

100

112

110

122

124

120

200

230

240

200

242

250

200

500

502 ─┐
Receive scene data for an image to be rendered

504 ─┐
Identify a fine object in the scene that can be modeled using a curve equation and a thickness 506 ─┐
Generate, for a subset of pixels of the image to be rendered, a linear approximation of the fine object having an increased thickness 508 ─┐
Perform ray tracing to determine a set of pixels where a sample location corresponds to the linear approximation 510 ─┐
Analyze the pixels in the set to remove false positives and pixels with lower than a threshold amount of coverage 512 ─┐
Determine a geometric shape for each remaining pixel in the set that represents the region of the pixel area occupied by the object 514 ─┐
Determine a percentage (or other measure) of the pixel area occupied by the geometric shape 516 ─┐
Perform pixel value blending of pixel values for the foreground (e.g., object) and background using blending (e.g., alpha) values determined using the determined percentage

DATA CENTER
800
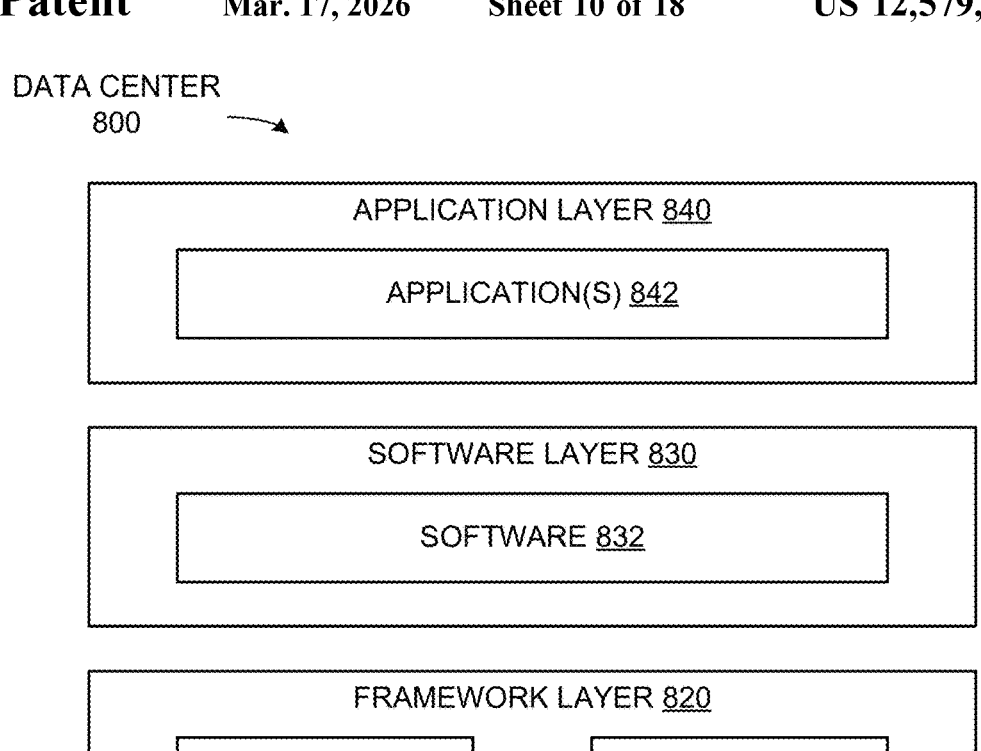
APPLICATION LAYER 840
APPLICATION(S) 842
SOFTWARE LAYER 830
SOFTWARE 832
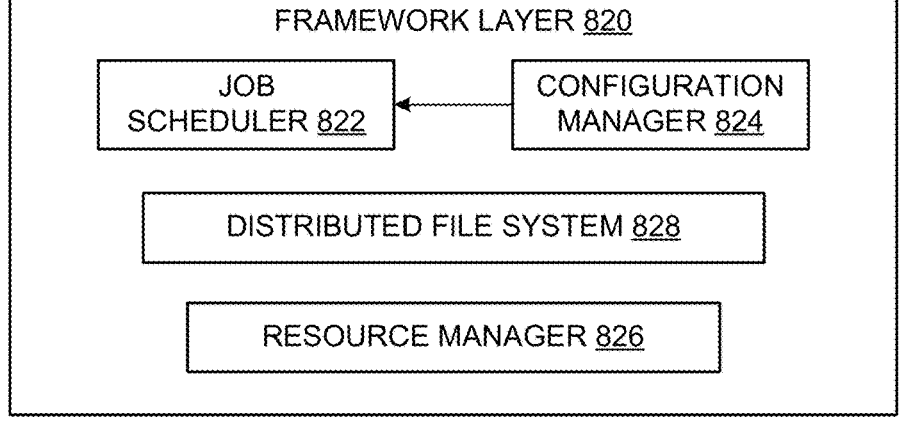
FRAMEWORK LAYER 820
| JOB SCHEDULER 822 | ← | CONFIGURATION MANAGER 824 |
DISTRIBUTED FILE SYSTEM 828
RESOURCE MANAGER 826
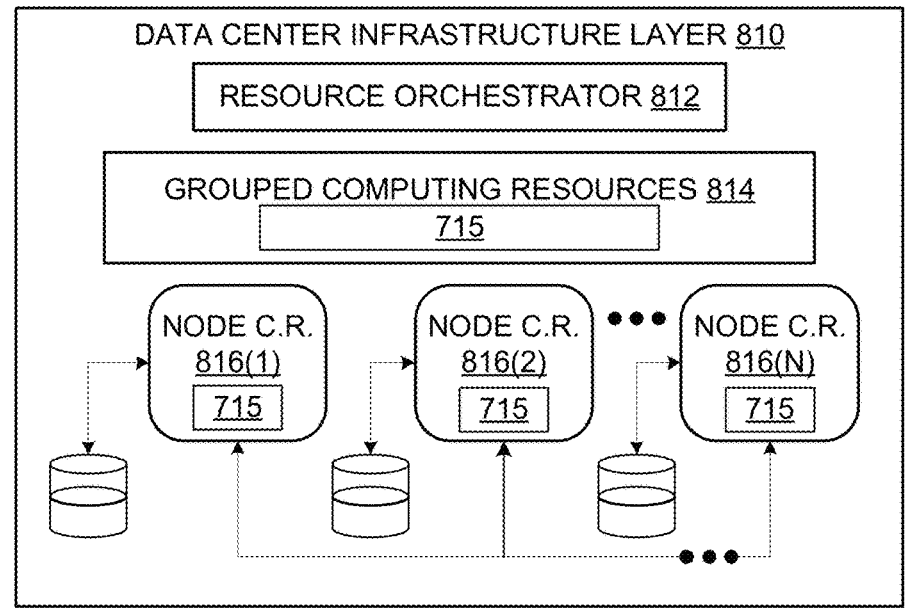
DATA CENTER INFRASTRUCTURE LAYER 810
RESOURCE ORCHESTRATOR 812
GROUPED COMPUTING RESOURCES 814
715
NODE C.R. 816(1)    715
NODE C.R. 816(2)    715
• • •
NODE C.R. 816(N)    715
FIG. 8

SUB-PIXEL CURVE RENDERING IN CONTENT GENERATION SYSTEMS AND APPLICATIONS

BACKGROUND

In various applications—such as for animation or online video game creation, for example—there can be a need to generate fine details, such as may correspond to individual hairs or other such objects or features. In some instances, objects such as individual hairs may be less than a pixel in width (or other dimension), such as where a person or character to whom the hair belongs is at least a minimum distance from a virtual camera used to determine a view of a scene at a determined resolution, or number of pixels. In many image generation processes, rasterization is performed where a thin or fine object, such as an individual hair or blade of grass, is represented as a curve tessellated into a sequence of triangles. A raster pipeline will go through every triangular representation of the curve to "conservatively" raster these triangles so they are each at least one pixel wide, which can help to avoid issues such as aliasing for sub-pixel wide curves, or other fine features. A process such as ray tracing can sample screen space at a sub-pixel level by performing an intersection test with scene geometries; however, tracing a single primary ray would not be enough to properly rasterize the curve, resulting in an image that may be of unacceptable perceptive quality. Increasing the number of samples could improve the quality, but may not be able to be performed with sufficient speed to be able to meet minimum frame rate or other such targets.

BRIEF DESCRIPTION OF THE DRAWINGS

Various embodiments in accordance with the present disclosure will be described with reference to the drawings, in which:

FIG. 5 illustrates an example process for generating image content including fine detail, according to at least one embodiment;

FIG. 8 illustrates an example data center system, according to at least one embodiment;

DETAILED DESCRIPTION

Figure 1A:
FIGS. 1A, 1B, and 1C illustrate images including curves used to represent human hair, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The systems and methods described herein may be used by, without limitation, non-content generation and gaming systems, autonomous vehicles, semi-autonomous vehicles (for example, in one or more advanced driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI with large language models ("LLMs"), light transport simulation (for example, ray-tracing, path tracing, etc.), collaborative content creation for three-dimensional ("3D") assets, cloud computing and/or any other suitable applications.

Disclosed embodiments may be comprised in a variety of different systems such as content generation or gaming systems, automotive systems (for example, a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more Virtual Machines ("VMs"), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

In at least one embodiment, a content generation system can render "fine" or "thin" objects, where at least one dimension—such as a width—of these objects may be less than the width of a pixel of an image to be rendered. These objects, such as hairs, threads, or fibers, can be represented by curves or curve equations, with each individual object being represented by a separate curve or equation in world or screen space. In at least one embodiment, images of the objects may need to be rendered in near real time, such as may be required to meet minimum frame rate targets of online video games. Due at least in part to the need to quickly generate individual images or video frames of content, traditional approaches to rendering small or thin objects, such as may be less than a pixel in width in screen space, can be deficient as they typically either require too many samples to be performed at the target frame rate or make compromises for improved efficiency that degrade the quality of the final rendered output. In identifying fine objects, such as strands of hair, grass, string, wires, or other fine objects or materials, that are to be used to determine the final pixel colors of various pixels, a representative curve can have an initial width appropriate for the (e.g.,) hair, but can also have an "inflated" width determined that is at least one pixel in width, and in some instances one pixel in width on each side of the representative curve for a total width of two pixels to make sure that no pixels are missed that the inflated curve might pass through. Ray tracing (or another such light transport simulation approach) can be performed for pixels that include at least a portion of this inflated curve, in order to provide for a conservative sampling or set of pixels that are covered or intersected by these curves. Pixels that do not have a "hit" for a traced ray with respect to the object, or which are determined to contain less than a threshold amount of an object, can be removed from consideration. For pixels where there is a hit from a traced ray, a convex geometric shape of the curve can be determined within that pixel. The normal of the curve within that pixel (which can be deduced from the curve tangent at the hit, and which can be more stable) with the curve thickness can be used to represent the portion of the curve within a given pixel by a straight line. A pair of line segments, with corresponding linear equations, can be determined that approximate the edges of the line representation of the curve within a pixel, and an intersection test can be performed with respect to the bounds of the pixel to determine the corresponding intersection points with these linear equations. Identified intersection points can be used to determine which vertices of the pixel boundary, or quad, are contained within the width of the curve and form part of the geometry of the curve inside the pixel quad. The intersection points and vertices can be used to determine a convex geometric shape corresponding to the curve within that pixel. The percentage of space in that pixel quad that is occupied by this geometric shape can be calculated, and this percentage (or fraction, etc.) can be used as an alpha value to perform alpha blending for that pixel. In alpha blending the color of the foreground curve can be blended with the background color at that pixel location, for example, according to the alpha value or blend weight in an anti-aliasing process. A determination can be made as to which curves should be considered for a given pixel. In at least one embodiment, only the curve that is "on top" or closest to the virtual camera is considered for a pixel, to avoid having to perform these operations for multiple curves that may intersect a given pixel but will not substantially impact the final value of the pixel or overall appearance of the final rendered image. Other approaches can be used as well, such as random selection, artist specification, and the like. Such an approach can be used to analytically rasterize a fine curve for use with a ray tracing pipeline so that fine detail is preserved and a high quality image produced. Such an approach also allows for the efficient computation of alpha or blending values to be used to determined pixel values corresponding to these fine curves or objects.

Figure 1B:
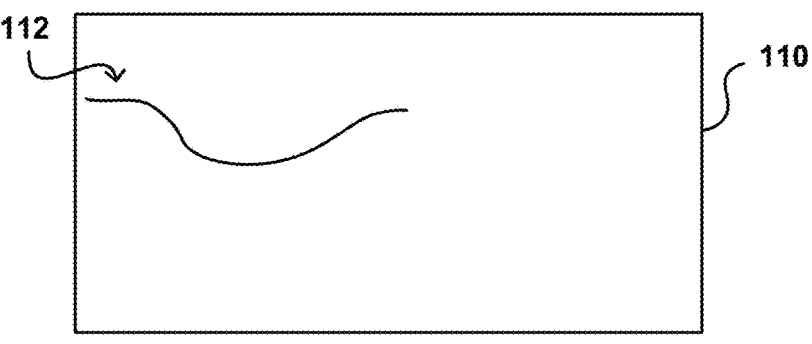
Figure 1C:
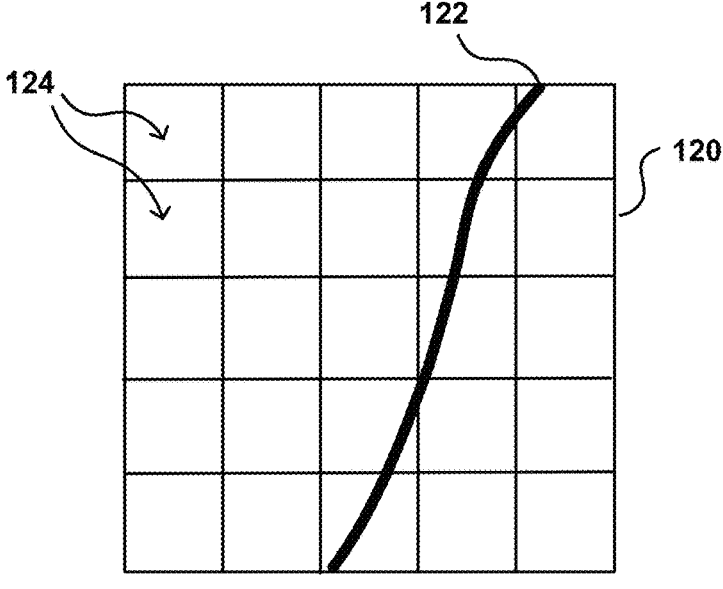

FIG. 1A illustrates an example image 100 that can be produced using an image generation process in accordance with at least one embodiment. In this example, a person or character to be rendered in an image has hair that is represented by a large number of individual hairs. As illustrated in the image 110 of FIG. 1B, an individual hair 112 of the person or character can be represented or modeled separately, and can be approximated using a curve having a determined width. An individual hair will have a determined width in object space, and the width of that hair in screen space can depend in part upon the "distance" between that hair and a virtual camera used to determine the view of the person or character, as well as any other objects of a scene or environment to be represented in a generated image. In at least some instances, the width of the hair in screen space will be less than one pixel in width (or other dimension). For example, in the image 120 of FIG. 1C, a portion 122 of a hair is illustrated, and the width of the hair in this image is significantly less than the width of the individual pixels 124 at the current view distance and the resolution of the image to be generated. In some instances, an image may be generated at a lower resolution for transmission and then upscaled or upsampled for display, such that the width of pixels in the generated image may be relatively larger with respect to an individual hair than the relative width of a pixel in a final generated image.

Approaches in accordance with various embodiments can analytically and efficiently rasterize a fine curve for use with a ray tracing pipeline so that fine detail is preserved and a high quality image produced. Such approaches can involve using an increased width of a curve (or other representation) for purposes of ray tracing or sampling, a widened curve can be used to determine conservative sample locations. Other approaches can be used as well, such as to shoot a primary ray for a pixel and then also consider rays traced for neighboring pixels, such as in a 3×3 pixel matrix centered around the pixel of interest, to determine whether there are any hits for a given object in at least one of these neighboring pixels. While conservative, such an approach to determining sample locations for a hair can be considerably more efficient than sampling each individual pixel location for a hit with respect to a given hair. The conservative sample positions can correspond to those pixels that could potentially include a portion of the thin curve, and an intersection algorithm can be used to determine whether the curve will at least partially intersect a given pixel. The portion of pixel area occupied by that curve (e.g., hair) can then be used to determine a blending value, such as an alpha value, to be used to determine a final pixel value for a given pixel in at image to be generated.

Figures 2A, 2B, 2C:
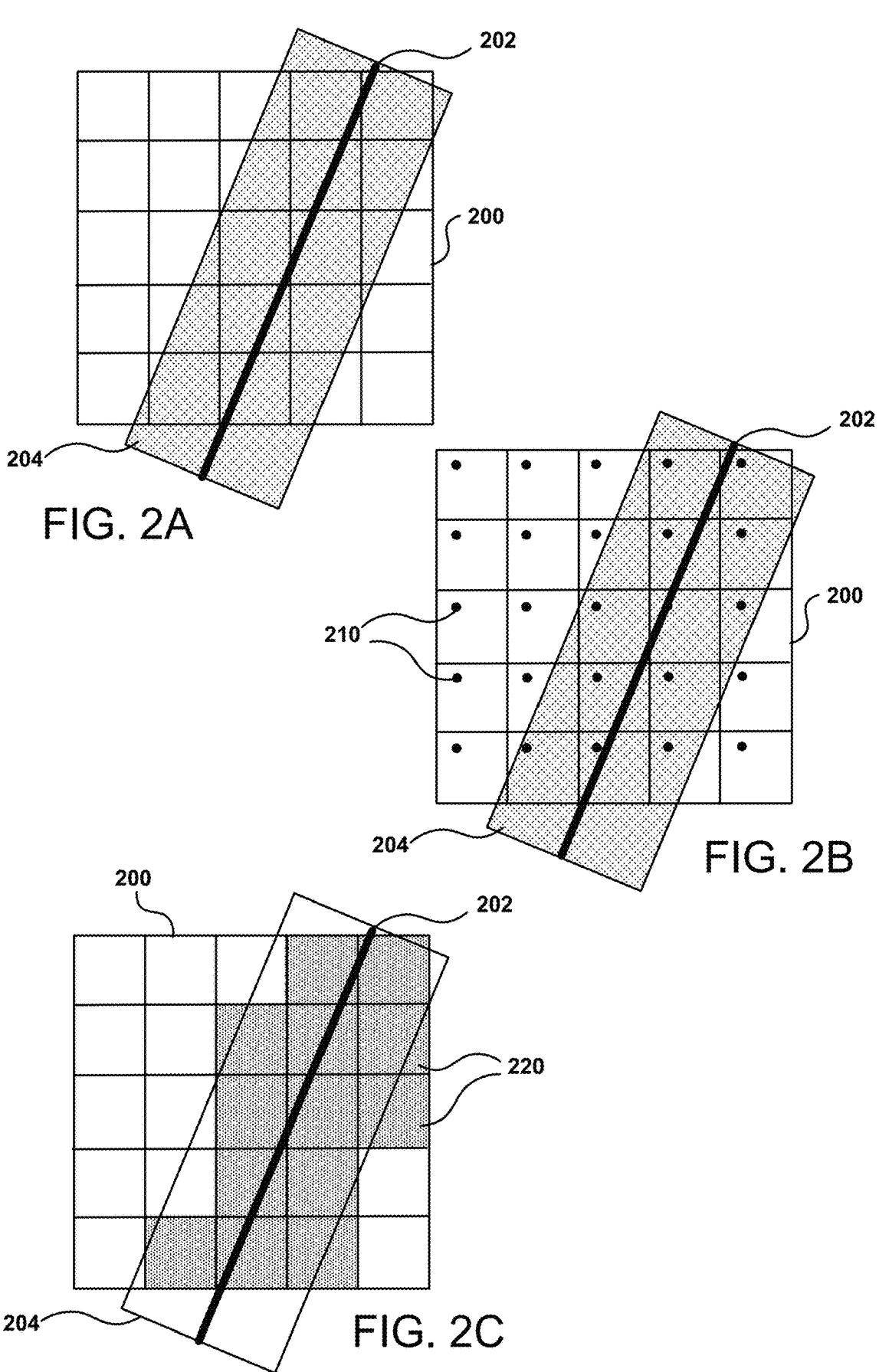
FIGS. 2A, 2B, 2C, 2D, 2E, and 2F illustrate stages of a sampling and rendering process for a fine curve, according to at least one embodiment.

As an example, FIG. 2A illustrates a portion of a hair that is to be rendered in a subset of pixels 200 of an image to be generated. In this example, the portion of the curve can be represented by a line segment 202 passing through these pixels 200. In other embodiments, non-linear representations or approximations of a curve or object can be used as well. An assumption can be made that for typical hairs or thin objects, the curvature will not change much between adjacent and individual pixels, such that the relatively small segment of the curve can be approximated using a straight line or segment within the bounds of a given pixel in pixel space. In at least one embodiment, the straight line segment can be determined or defined by the normal of the curve within the bounds of that pixel. Once the segment is determined using the curve normal, the width of the curve can be applied that will provide a small and straight band, which can be used for purposes such as intersection detection and ray hit determination.

The width of the line segment 202 can correspond to the approximate width of the corresponding hair or curve at the determined distance from a virtual camera to be used to generate the image of the object or scene. In this example, it is illustrated that the width of the line segment 202 is less than the width of individual pixels at a target resolution of an image to be generated. Because the segment occupies only a fraction of the area of a given pixel, a ray tracing process might be likely to select sample positions that do not correspond to the hair, and thus may not represent the presence of the hair in the pixel when rendered. Accordingly, an approach in accordance with at least one embodiment can consider a wider or "inflated" line segment 202 for at least sampling, hit determining, or ray tracing purposes. In the example of FIG. 2A, the inflated line segment has a width selected that is at least one pixel width on each side of the line segment, such that any pixel through which the line segment passes will have a majority of its area occupied by the inflated line segment.

FIG. 2B illustrates an example view of the set of pixels 200 including a set of sample locations 210 where a ray tracing process may perform sampling or ray tracing for each pixel. In this example, the ray tracing process selects the same sample position within each individual pixel, or the same coordinate location within each pixel. The sample location may not be at the center of each pixel, however, as a process such as sample jitter can be used where the sample locations vary slightly between successive frames to attempt to capture sub-pixel detail even though sampling is performed at a pixel level. As illustrated, only a fraction of the sample points for pixels through which the line portion crosses would "hit" the line segment 202. For the inflated line segment, however, each sample location in a pixel that the line portion crosses is illustrated to hit the inflated line segment. Thus, such a sampling approach can be used to quickly determine the set of possible pixels through which a hair, curve, or other thin object or fine feature may be represented. While still being conservative, such an approach can be much more efficient in determining pixels to sample for a given hair than for other, prior sampling approaches. The set of such candidate pixels 220 is illustrated in FIG. 2C, where a sample point was determined to hit the inflated line segment 204.

Figures 2D, 2E, 2F:
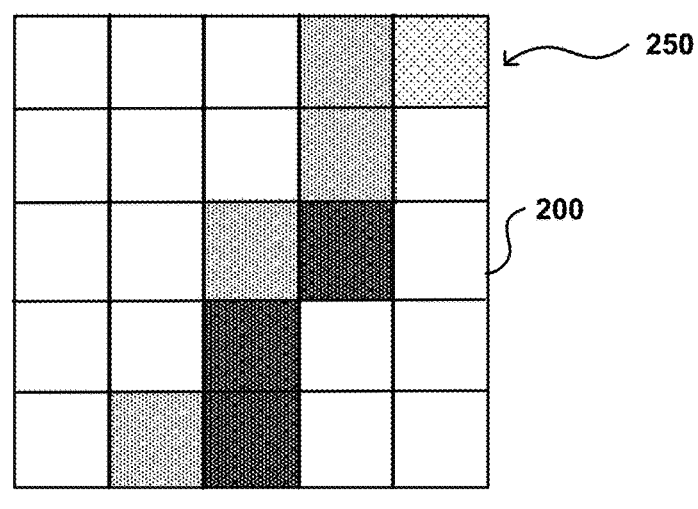

As illustrated in FIG. 2C, there may be certain pixels in which the sample point hits the inflated line segment, but which the original curve did not actually intersect. These pixels can be identified as false positives, and knowing the equation and location of the curve or line segment can allow these pixels to be algorithmically identified as false positives, which can then be removed from further consideration. It may also be the case that the original curve, line segment, or hair only occupies a small portion of the area of a pixel, such that it might produce better results to consider a different hair or at least not consider the impact of this hair on the final pixel value of that pixel, as it may have little impact on the final color and could reduce resources needed to render the image if objects or features with little impact on final pixel value are removed from consideration. Accordingly, an algorithm can also be used to determine the "coverage" of a curve in a given pixel, which can correspond to the portion or fraction of pixel area for a given pixel in screen space that is occupied by the line segment. As illustrated in FIG. 2D, the shadings 230 of the pixels can indicate a portion or coverage of the hair in individual pixels, and can also be used to indicate which pixels originally considered under the conservative approach were determined to be false positives. In this example, a darker color can represent a higher pixel coverage value, although other approaches can be used as well. Further, the shading 230 in FIG. 2D is provided primarily for purposes of explanation, and in many embodiments, coverage can be computed mathematically without need to generate any graphical representation. Once the coverage values have been determined for the pixels under consideration for a given curve, a threshold (or at least one other selection criterion) can be applied to these values to determine which pixels to exclude from consideration. For example, a threshold might be set such that if a curve occupies less than 5% of the area of a pixel, then that curve is not to be used to determine the final color of that pixel. In some embodiments, a minimum threshold might be set such that any pixel for which the coverage value is greater than 0% or 1% is to be considered, and may thus have a value stored to a g-buffer of a shading pipeline, for example.

After applying such a threshold and determining which pixels have at least a minimum coverage of the inflated curve, a set of candidate pixels 240 can be selected as illustrated in FIG. 2E. During a forward shading pass of a ray tracing process, the same primary rays can be traced (or "shot," etc.) at the same sample locations, to determine which rays (or sample points 242) actually hit or intersect the non-inflated original curve or line segment. The values determined from this process can then be provided as input to an alpha blending process, for example, where the alpha values (or other blending values) for individual pixels are determined based in part on the coverage values for those pixels. The alpha values can be adjusted in at least some embodiments to account for the false front hits from the ray tracing process for this image or frame. FIG. 2F illustrates an example final set of pixel values 250 of a set of pixels 200 of an image to be rendered, where the values represent the hair at the appropriate location in those pixels.

Such an approach can analytically rasterize a curve, or other fine feature, and can use features wider than the curve to conservatively and efficiently determine appropriate pixels for sampling. Once the pixels are identified, the geometry information for the curve can be used to determine whether the curve will intersect a given pixel, as well as the percentage coverage within that pixel. For example, the position of a line segment representative of the curve can be determined within a set of pixels. Using the line width, the edge positions of the line segment can be determined. The edge positions can be used to determine whether at least one edge of the line segment intersects the bounds (or "quad") of a given pixel, as well as the portion of the pixel occupied by that line segment. Any of a number of intersection algorithms can be used to determine whether at least one of these edges intersects with the bounds of a given pixel, as well as the location and number of such intersection points 302, 304. For any given pixel there can be between 0 (no intersection points) and 4 intersection points, with up to two intersection points for each edge of the curve (or representative segment).

Figure 3A:
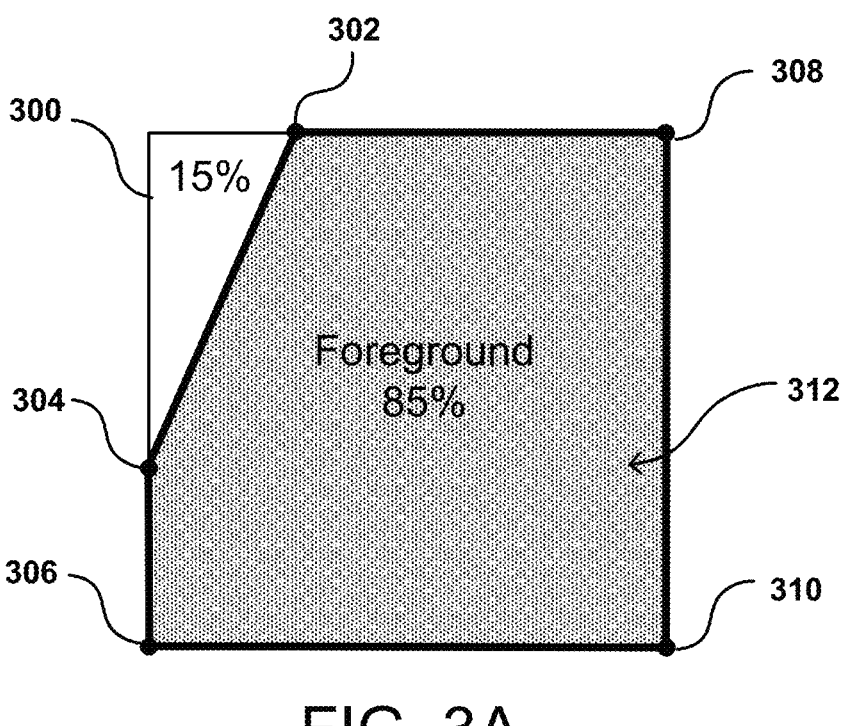
FIGS. 3A and 3B illustrate stages of an alpha blending process, according to at least one embodiment.
Figure 3B:
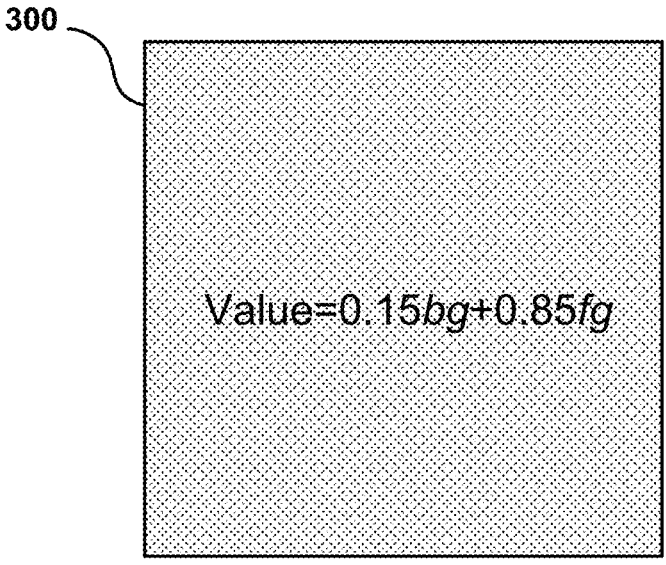

Once the intersection points are determined, the corner coordinates of the pixel bounds can be tested to determine whether those coordinates are internal or external to the line segment. For example, using only the intersection points 302, 304 would not be sufficient to determine whether the line were to the left or the right of the line between those points 302, 304 as illustrated in FIG. 3A. A testing algorithm can be used to determine that three of the pixel corners 306, 308, 310 are within the line segment, and the coordinates of those corners can be identified. Once the intersection points 302, 304 and included pixel corners 306, 308, 310 are identified, these points can be used to determine a convex geometric shape 312 corresponding to the portion of the line segment represented in this given pixel. The percentage (or fraction or portion, etc.) of the pixel area that is occupied by this geometric shape can be calculated, which in this example might indicate that 85% of the pixel area is occupied by the line segment and 15% is not. In this case, an alpha (or blending) value of 0.85 might be set, where a single final pixel value of the pixel in the rendered image is determined, as illustrated for the pixel 300 in FIG. 3B, where the final pixel value is a blended combination of the hair color and background color as weighted by the alpha value, such as may be given by value=0.15*(background color)+ 0.85*(foreground/hair color)–or value=α*foreground+(1– α)*background. In at least one embodiment, the hair can be considered to have a single color within a given pixel, as a single color is all that can be rendered for a given pixel in such a process, and any intended variation can be captured in the determined pixel value for the hair (or other foreground object) at that location. As used herein, "pixel value" can refer to any value that can be used in generating an image, or image data, to represent a final color or appearance of that pixel, as may include a color value or brightness value, among other such options. In at least one embodiment, the foreground pixel values and alpha values can be determined during a forward shading pass, then blending with the pixel values of the background can be performed during a backward shading pass to arrive at the final pixel values (not considering any additional or potential post-processing to be applied). Any such geometric shape will be convex, and the locations or coordinates of all the vertices can be averaged (or otherwise processed, such as by using a centroid function) to determine a point in the middle of the geometric shape that can be used to break the geometric shape into triangles or other shapes to be used in a shading and/or rendering process.

Alpha blending as used herein can refer to a weighted blending or combination of pixel values to be used to determine the final pixel value (e.g., color value) for a pixel in pixel space. If there is only one object visible (from a point of view of a virtual camera used to generate an image) within the bounds of a pixel then the color of that object can have a blending or "alpha" value of 1.0, so that the pixel value of that object at that location will correspond to the pixel value used for that pixel (disregarding the possibility of transparency, reflections, glare, or other aspects that might impact the final pixel value, which may be considered as another object at that pixel location in at least one embodiment). If there are two objects that occupy equal portions of a pixel boundary, or if one object overlays another object over the entire pixel area but has 50% transparency (or opacity), then an alpha value of 0.5 can be used for each object so that the final pixel value is an average of the two pixel values. In many situations where there are two or more objects visible (or at least considered to be visible) for the area of a pixel, there will be unequal contributions to the final pixel color, and determining alpha values (or blend weights) can be useful in determining a final pixel value based on these weighted contributions. Alpha values can thus be determined based upon various factors, including spatial, reflective, specular, and/or transmissive factors, among other such options. Thus, a hair that occupies 50% the area of a pixel and has a 50% opacity value might have a calculated alpha value of 0.25.

In at least one embodiment, pixels corresponding to a hair region can be represented by a single, selected hair (or foreground object) and background. While there may be multiple different hairs of sub-pixel width at least partially visible at a current pixel location, the hairs will be of similar color and considering more than one hair per pixel may not appreciably change the final pixel color but may drastically increase the resources needed to process all potential hairs at all potential pixels. In at least one embodiment, a hair rendering system can select (at most) a single hair per pixel, such as a hair that is closest to the virtual camera or "on top" in the set of hairs, or a hair that occupies the most space within the pixel. Selecting the hair on top can make sense as it will be most likely to be perceptible to a user if not rendered accurately. Human eyes are not as sensitive to overlapping hairs underneath an outer hair or object. In many instances, the ends of a hair or the hair on top are most visible and perceptible to a user, and thus may be considered to be of higher importance for realistic rendering.

Selecting a single hair (or curve, etc.) per pixel location can help improve the speed of rendering in addition to decreasing the resources required for the rendering. For operations such as online gaming, it can be important for the rendering to occur within a maximum period of time. If a game is to run at a frame rate of 60 frames per second (fps), for example, then the rendering of each frame must occur within that frame rate. Being able to reduce the number of objects to be considered or sampled during rendering can help to improve the rendering speed, which can be important as factors such as resolution, perceptive quality, and level of fine detail continue to increase. By only having to consider at most one hair per pixel location instead of all possible hairs at that location, the amount of sampling and value processing to be performed can be reduced significantly, resulting in significant resource, cost, and time savings. Such an approach can allow for a thin, anti-aliased curve to be rendered using a ray-tracing process in near real time in at least one embodiment. Intelligent sampling can be performed so that it is not necessary to shoot a large number of rays, which would largely avoid intersecting a given hair or object. Approaches presented herein also allow for high quality rendering with minimal samples or rays used per frame, such as one ray or sample location used per pixel location, with sample jitter used to attempt to further retain fine sub-pixel detail.

Figure 4:
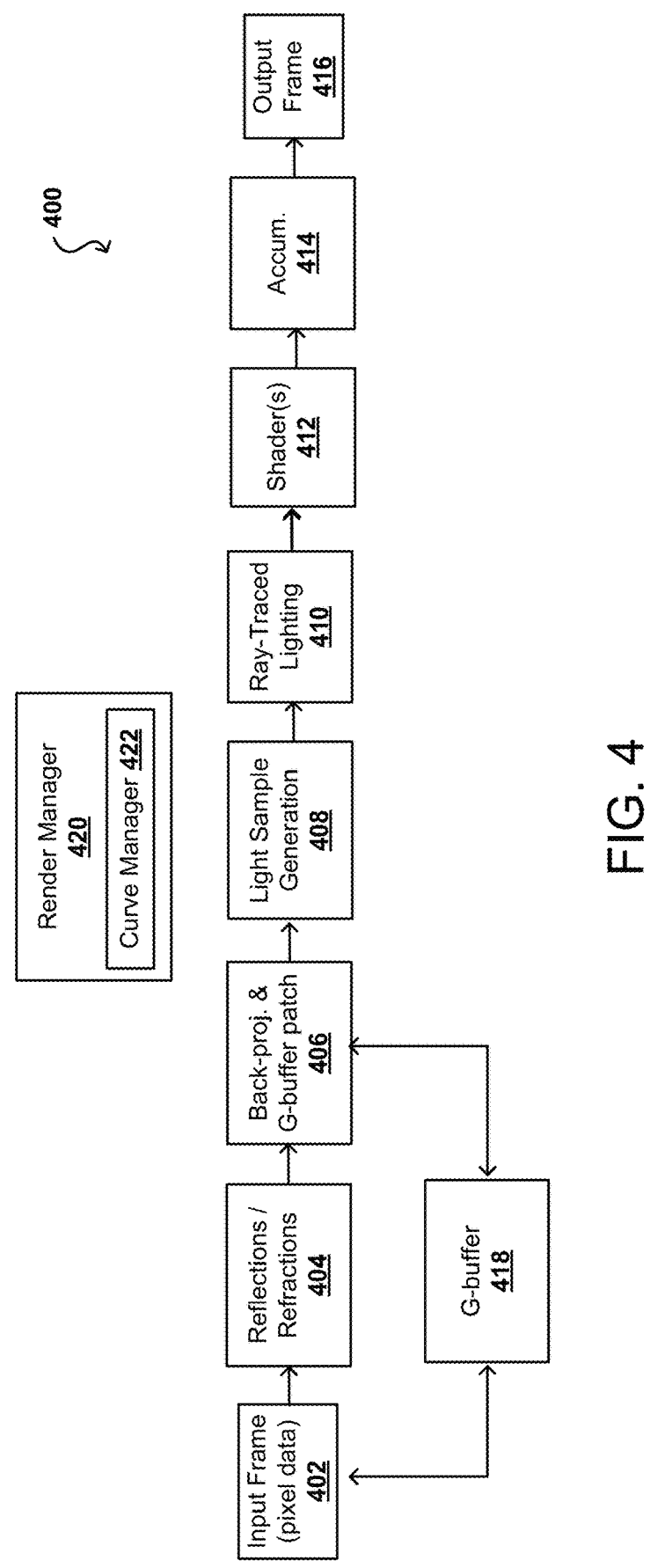
FIG. 4 illustrate components of an example content generation system, according to at least one embodiment.

As mentioned, such approaches to pixel value determinations in a ray tracing or other such process may be performed as part of an image generation process or system. FIG. 4 illustrates components of an example rendering (or content generation) pipeline that can be used with such a system or process. Such a pipeline can be used to generate or synthesize one or more images, such as video frames in a sequence. In this example, pixel data 402 for a current frame to be rendered (as may include G-buffer data for primary surfaces) can be received, as may include pixel data for various objects to be rendered in a scene from a point of view defined by a virtual camera. The pixel data can be provided as input to a reflections and refractions component 404 of the rendering pipeline. A reflections and refractions component 404 can attempt to determine reflections and/or refractions of the pixel data, and can provide this data to a back-projection and G-buffer patching component 406, which can perform back-propagation to locate corresponding points for those reflections and refractions, and use this data to patch the G-buffer 418, which can provide updated input for a subsequent frame to be rendered. The pixel data can then be provided to a light sample generation component 408 to perform light sampling, a ray-traced lighting component 410 to perform ray-traced lighting, and one or more shaders 412 (which may be implemented in hardware and/or software), which can set the pixel colors for the various pixels of the frame based at least in part upon the determined lighting information (along with other information such as color, texture, and so on). The results can be accumulated by an accumulation module 414 or component for generating an output frame 416 of a desired size, resolution, or format.

In at least one embodiment, operations of the pipeline 400 can be performed under direction of a render manager 420 or other such system or process. The render manager can perform tasks such as to direct a ray-traced lighting component 410 to perform ray tracing to obtain samples at determined locations, and perform hit testing. The render manager can use a curve manager component 422 or process to determine which object (e.g., hair) is to function as a foreground object for a given pixel, as well as to determine intersections and coverage that can be used to calculate alpha blending values. The curve manager 422 can then work with the shader 412 during shader passes to perform shading and blending tasks to determine final pixel values, including for those pixels in which at least a portion of a fine object or curve, such as a hair or bristle, is located.

In at least one embodiment, a light sample generation component 408 can perform a backward projection step. Once a backward projection pass has finished, and gradient surface parameters have been patched into the current G-buffer, a renderer can execute the lighting passes. Using information from the lighting passes and the lighting results from the previous frame, gradients can be computed then filtered and used for history rejection. Such an approach can be used to compute robust temporal gradients between current and previous frames in a temporal denoiser for ray traced renderers. Such a backward projection-based approach can also work through reflections and refractions, and can work with rasterized G-buffers. Some approaches for backward projection may omit G-buffer patching and may rely on the raw current G-buffer samples instead. Patching surface parameters can help to reduce or eliminate false positives in the vast majority of cases, making the denoised image very stable yet still quickly reacting to lighting changes. Once the backward projection pass is finished, and gradient surface parameters have been patched into the current G-buffer, a renderer can execute the lighting passes. Using the information from the lighting passes and the lighting results from the previous frame, the gradients can be computed.

In at least one embodiment, such a pipeline may generate images or video frames in a sequence, where at least some amount of temporal information is retained between frames. Various types of information may thus be at least temporarily stored to one or more buffers between frames, such as may involve at least one graphics buffer, as may include or work together with a color buffer, a motion vector buffer, and/or a depth buffer, among other such options. In at least one embodiment, a pre-processor, such as may involve one or more processes running on one or more processors on one or more computing devices, can receive as input color information for a current frame as produced by a rendering engine or application, as well as output of a warper, such as a warping function or application executing one or more processors of one or more devices. In at least one embodiment, this warper receives as input motion vector information for a current frame as stored in a motion vector buffer, as well as depth information for a current frame, as stored to depth buffer. In at least one embodiment, a warper may receive this data directly from an application or renderer and may not utilize dedicated buffers. A temporal process can also provide, as input to warper, high resolution color data from a previous image in a sequence, as stored to a history buffer. Information for each final output image can also be stored to a history buffer for use in generating a subsequent image or frame in a sequence. A warper can utilize this motion vector and depth data to warp pixel data or color data for specific features of a prior image to corresponding pixel locations in a current image frame, effectively using these motion vectors to map corresponding pixel locations of features in these two images so color values for similar features can be compared and blended. A pre-processor can perform any relevant processing on current color data from color buffer or warped prior color data from warper. The data, after any pre-processing, can be provided as input to a neural network, such as a deep learning (DL)-based generator, which can analyze this data to determine pixel specific weightings for each pixel location in an image to be generated. The generated data can be processed by a post-processor, which may include one or more processes executing on one or more processors of one or more computing devices, which can output a final high resolution color image. In at least one embodiment, this post-processor can also output information to be stored to high resolution color and historical buffer for use in generating a subsequent image in a current sequence.

In at least one embodiment, generation of a frame using such an approach can involve an application providing to a reconstruction algorithm a low resolution jittered input image and associated jitter values, low resolution backward motion vectors per individual input image pixels, and other quantities, such as exposure values and a depth buffer. These low resolution input (backward) motion vectors can be used to warp a previous frame output image to align with geometry in a current time step. A low resolution current frame image (after any denoising and detail enhancement as discussed herein) can be upsampled to a resolution of an output image using an upsampling algorithm. A neural network can be used to infer a weighting value w for each output pixel (at an output resolution). In at least one embodiment, a high resolution output image for a current frame can be created as:

$$\text{output} = w * (\text{upsampled current frame input image}) +$$

$$(1 - w) * (\text{warped previous output image})$$

In this type of temporal image reconstruction algorithm, a significant factor in resulting image quality (IQ) can be due to weighting factor w above. In at least one embodiment, w should adapt to various criteria, including at least that where a region in an output image is dis-occluded due to motion of objects in a rendered scene, this weighting factor should favor a current input image, or weight color values more heavily from a current image, such as where w=1.0. Where a region in an output image is visible (and shaded similarly)

in a previous frame, an optimal weighting factor can result in a suitable blending between these previous output and current input images. In at least one embodiment, this blending can favor history data more, such as where a value of w approaches zero, as more frames have had this region visible.

A network can base this predicted weighting, at least in part, upon current frame input image and warped previous frame output image. In at least one embodiment, wherever an upsampled current image has significantly different values from a warped previous frame output image, and thus would appear very different when displayed, a neural network can predict a high valued weighting factor w, giving more importance to an upsampled current frame input image. When a current image has similar values to a warped previous frame output image, and thus would appear very similar when displayed, a neural network can predict a low valued weighting factor w, giving more importance to a warped previous frame output image.

FIG. 5 illustrates an example process 500 to generate an image in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example will be discussed with respect to thin, elongated objects, such as hairs, grass, fibers, or strings, there can be other types of objects or features that may be synthesized using such a process as well within the scope of various embodiments. In this example, scene data is received 502) or otherwise obtained for an image to be rendered, as may correspond to a single image or one of a sequence of images, such as a frame of video for a scene. A "fine" object can be identified 504 in the scene that can be modeled using a curve equation and a thickness, or other such mechanisms or values. In some embodiments a collection of such objects may be defined or identified where such a modeling approach can be used advantageously, such as "hair" of a character that includes multiple individual hairs rather than identifying each individual hair as such an object individually. In some embodiments, certain types of object may specify such modeling in a classification or tag, or may instead be defined using equations that can then be used to identify or determine that such modeling may be applied beneficially.

In this example process, a curve can be modeled as a collection of linear segments since the curvature will typically not vary significantly between adjacent pixels. Accordingly for one or more subsets of the image to be rendered, a linear approximation of the fine object can be generated 506, where the linear approximation can be associated with a first thickness corresponding to the thickness of the object (e.g., hair), as well as an inflated thickness that may be based at least in part upon the relative size of a pixel in the image to be rendered. In at least one embodiment, the width of a pixel is projected into screen space to determine the target width for the inflated curve, which can be at least two pixels wide in order to capture all potential pixels that the curve might intersect. The slope or orientation of the segment can correspond to a normal vector for the curve within the bounds of the pixel. The inflating of the thickness can be performed in both directions with respect to the elongated segment or curve, and used to increase the area to be used for ray tracing or sample selection as discussed herein. The inflated width can also be at least partially depth-dependent, as objects further from a virtual camera may need larger inflated widths to increase sampling probability. The elongated edges of the inflated line segment can then each be described using a respective linear equation. Ray tracing (or another sampling process) can be performed 508 to determine a set of pixels where a sample location (or ray intersection point) corresponds to the inflated linear approximation of the object. These are referred to herein as "conservative" hits, as the intersection is with respect to the inflated thickness. Such a process can help to efficiently determine pixels to be used for sampling of an object such as a strand of hair that is less than a pixel wide, and might not be frequently sampled if a random sampling approach were to be used. The pixels in the set, which were selected using the inflated approximation, and analyzed 510 algorithmically (or otherwise) to remove false positives, or pixels in which the uninflated object does actually not appear or intersect, as well as to remove from consideration pixels where the presence of the object in the pixel region is determined to be insignificant, such as where the object occupies less than a threshold percentage of area of an individual pixel.

For each of the remaining pixels, a geometric shape can be determined 512 that represents the area or region of a pixel (in pixel space) occupied by the object. This can be determined in at least one embodiment by running an intersection test between the elongated edges (or the linear equations for those edges) of the object and the bounds of the pixel. For a line segment of a specific width, where the line segment can have been determined using the normal of the representative curve in that pixel, the intersection test can look at each of the elongated edges to determine whether there are 0, 1, or 2 intersections with the bounds of the pixel. If there is at least one intersection of the bounds of the pixel with at least one edge, then coordinate testing can be performed to determine which corners of the pixel bounds are contained within the area of the object (or thick line segment). In at least one embodiment, this can involve performing a dot product of the normals and determining a difference in signs. The contained corners and intersection points can be sorted, such as in a clockwise or counterclockwise manner, and used to determine the geometric shape representing the object region for given pixel location. A percentage of the pixel area occupied by that geometric shape can be determined 514 for each respective pixel, where the percentage can be used to determine a blending weight for the pixel value of the object with respect to that pixel location. Other factors may be used as well, such as opacity or reflectance in at least one embodiment. Once the blending or alpha values are determined for a given pixel, at least a foreground pixel value and a background pixel value can be blended according to the alpha value(s) to determine a final pixel value for that pixel value 516. That final pixel value can then be used when generating the final output image, subject to any additional processing or modification to be performed.

Figure 6:
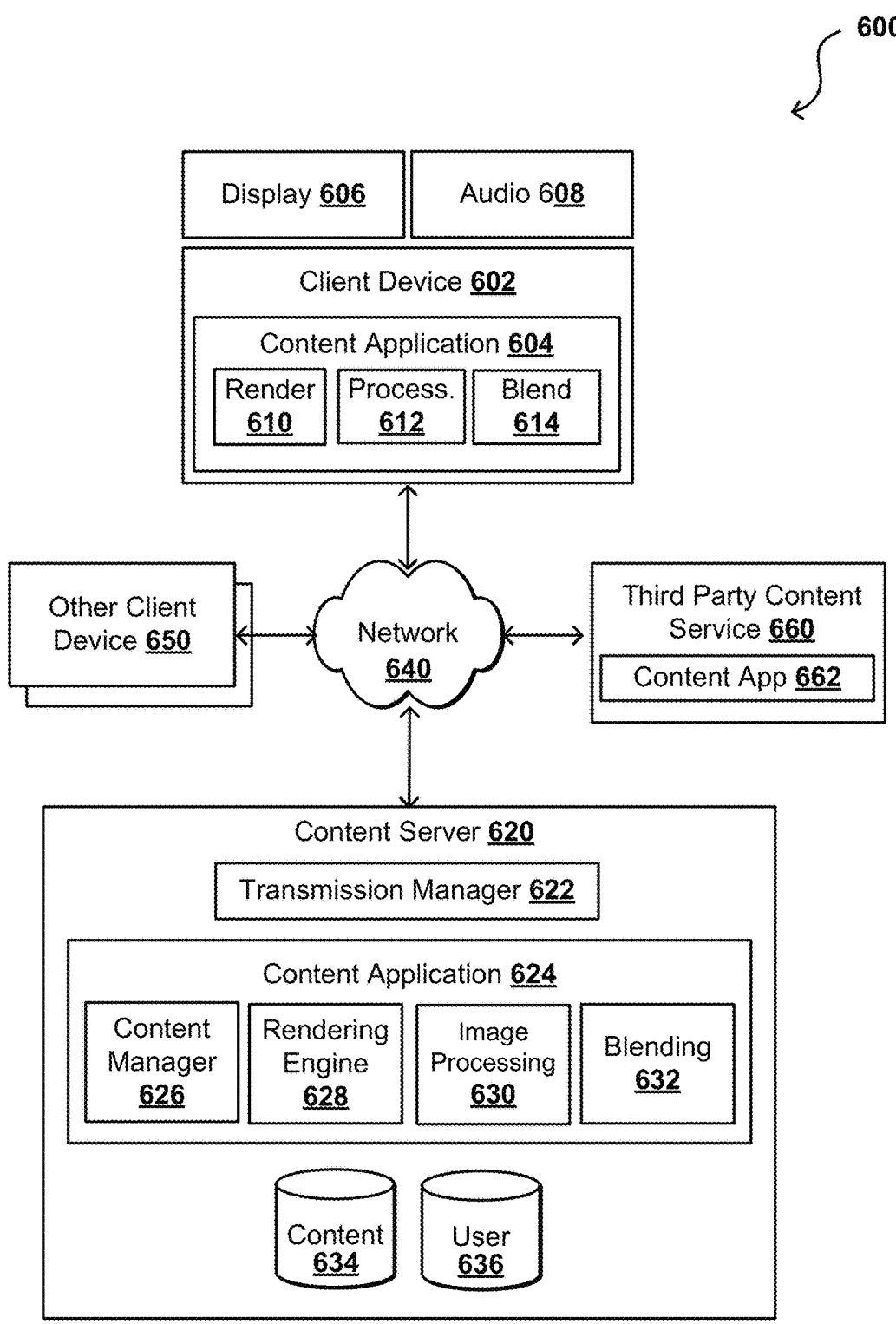
FIG. 6 illustrates components of a distributed system that can be used to perform content synthesis, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a content application 604 on a client device 602 and data stored locally on that client device. In at least one embodiment, a content application 624 executing on a server 620—such as a cloud server or edge server—may initiate a session associated with at least that client device 602, as may use a session manager and user data stored in a user database 636, and can cause content such as one or more object representations—such as one or more geometric meshes with density information—from an object repository 634 to be selected by a content manager 626 for processing. A content manager 626 may work with a rendering engine 628 or pipeline to generate such content. In at least one embodiment, a rendering engine 628 may work with an image processing component 630 and/or blending component 632 to attempt to determine the pixel values to use for individual pixels of an image to be rendered, as may be part of a shading process. As discussed herein, this can include performing conservative hit testing and alpha value calculation for thin or sub-pixel objects. At least a portion of the generated content—which may correspond to a synthesized image or data useful in generating such an image—may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a rendering engine 610, image processor 612, and blending component 614 for use in selecting, providing, synthesizing, rendering, modifying, or using content for presentation (or other purposes) on or by the client device 602. A decoder may also be used to decode data received over the network 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network ("LAN"), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more VMs. In at least one embodiment, such a system can be implemented at least partially in a data center or at least partially using cloud computing resources.

Inference and Training Logic

Figure 7A:
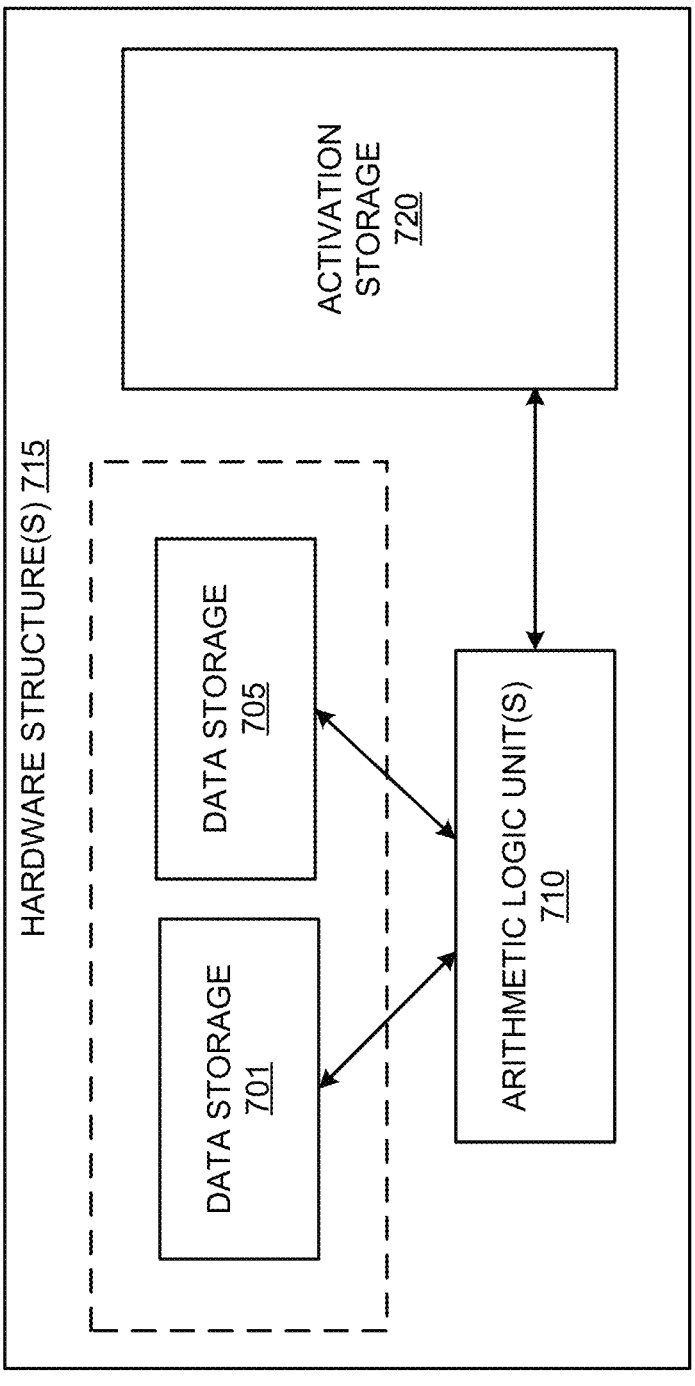
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic unit(s) ("ALU(s)"). In at least one embodiment, code, such as graph code, loads weight or other parameter information into processor ALU(s) based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (for example, Flash memory), or other storage. In at least one embodiment, choice of whether code and/or data storage 701 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, ALU(s). In at least one embodiment, code, such as graph code, loads weight or other parameter information into processor ALU(s) based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (for example, Flash memory), or other storage. In at least one embodiment, choice of whether code and/or data storage 705 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (for example, graph code), a result of which may produce activations (for example, output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 701 and/or code and/or data storage 705 are used as operands along with other values, such as bias values, gradient information, momentum values, or other parameters or hyperparameters, any or all of which may be stored in code and/or data storage 701 or code and/or data storage 705 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (for example, a co-processor). In at least one embodiment, ALU(s) 710 may be included within a processor's execution units or otherwise within a bank of ALU(s) accessible by a processor's execution units either within same processor or distributed between different processors of different types (for example, CPUs, GPUs, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (for example, Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash memory or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit ("IPU") from Graphcore™, or a Nervana® (for example, "Lake Crest") processor from Intel Corp. In at least one embodiment, inference and/or training logic 715 illustrated in FIG. 7A may be used in conjunction with CPU hardware, GPU hardware or other hardware, such as field programmable gate arrays ("FPGAs").

Figure 7B:
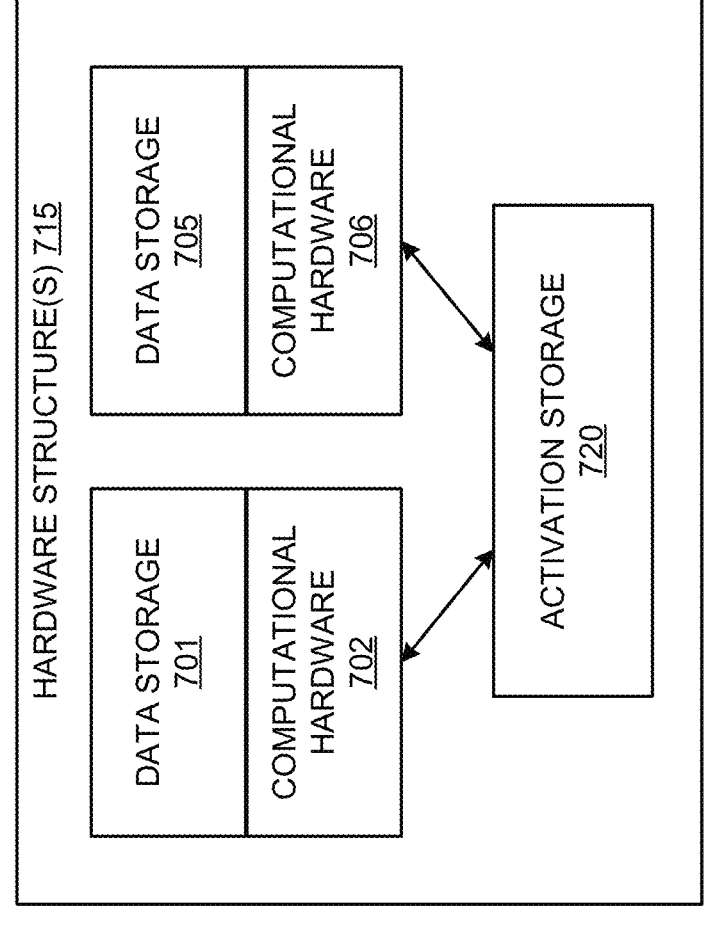
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an ASIC, such as Tensorflow® Processing Unit from Google, an IPU from Graphcore™, or a Nervana® (for example, "Lake Crest") processor from Intel Corp. In at least one embodiment, inference and/or training logic 715 illustrated in FIG. 7B may be used in conjunction with CPU hardware, GPU hardware or other hardware, such as FPGAs. In at least one embodiment, inference and/or training logic 715 includes, without limitation, code and/or data storage 701 and code and/or data storage 705, which may be used to store code (for example, graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALU(s) that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of CPUs or other processors (including accelerators, FPGAs, graphics processors, etc.), memory devices (for example, dynamic read-only memory, storage devices (for example, solid state or disk drives), network input/output ("NW I/O") devices, network switches, VMs, power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826, and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud, and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (for example, "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (for example, PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, ASICs, GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence ("AI") services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to efficiently determine alpha blending values for objects that may have at least one sub-pixel dimension but are to be accurately represented in generated image content.

Computer Systems

Figure 9:
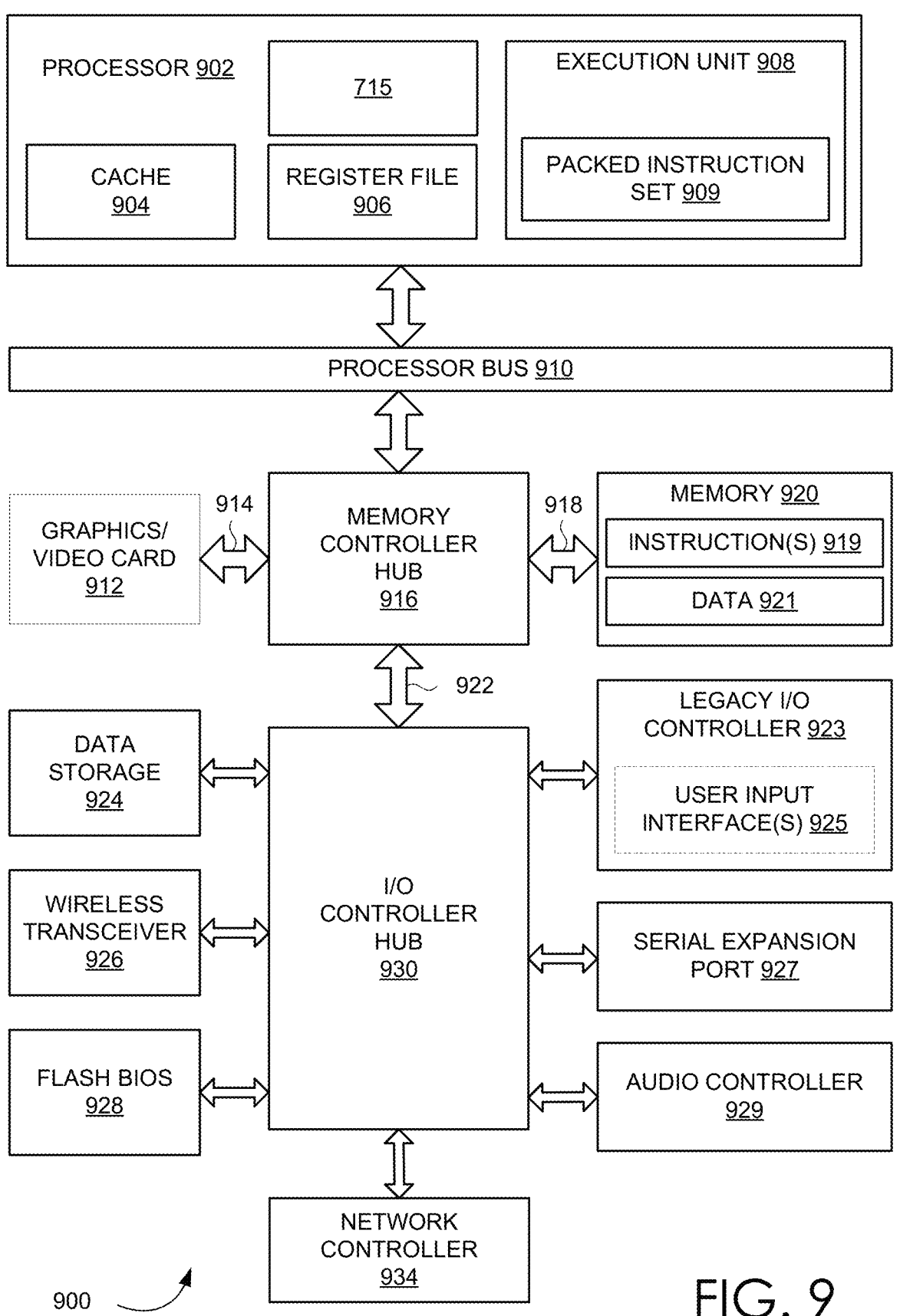
FIG. 9 illustrates a computer system, according to at least one embodiment.

FIG. 9 is a block diagram illustrating an exemplary computer system, which may be a system with interconnected devices and components, a system-on-a-chip ("SOC") or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), SOC, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution unit(s) 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a DSP, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit(s) 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit(s) 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, a SRAM device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interface(s) 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary SOC. In at least one embodiment, devices may be interconnected with proprietary interconnects, standardized interconnects (for example, PCIe) or some combination thereof. In at least one embodiment, one or more components of computer system 900 are interconnected using compute express link ("CXL") interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to efficiently determine alpha blending values for objects that may have at least one sub-pixel dimension but are to be accurately represented in generated image content.

Figure 10:
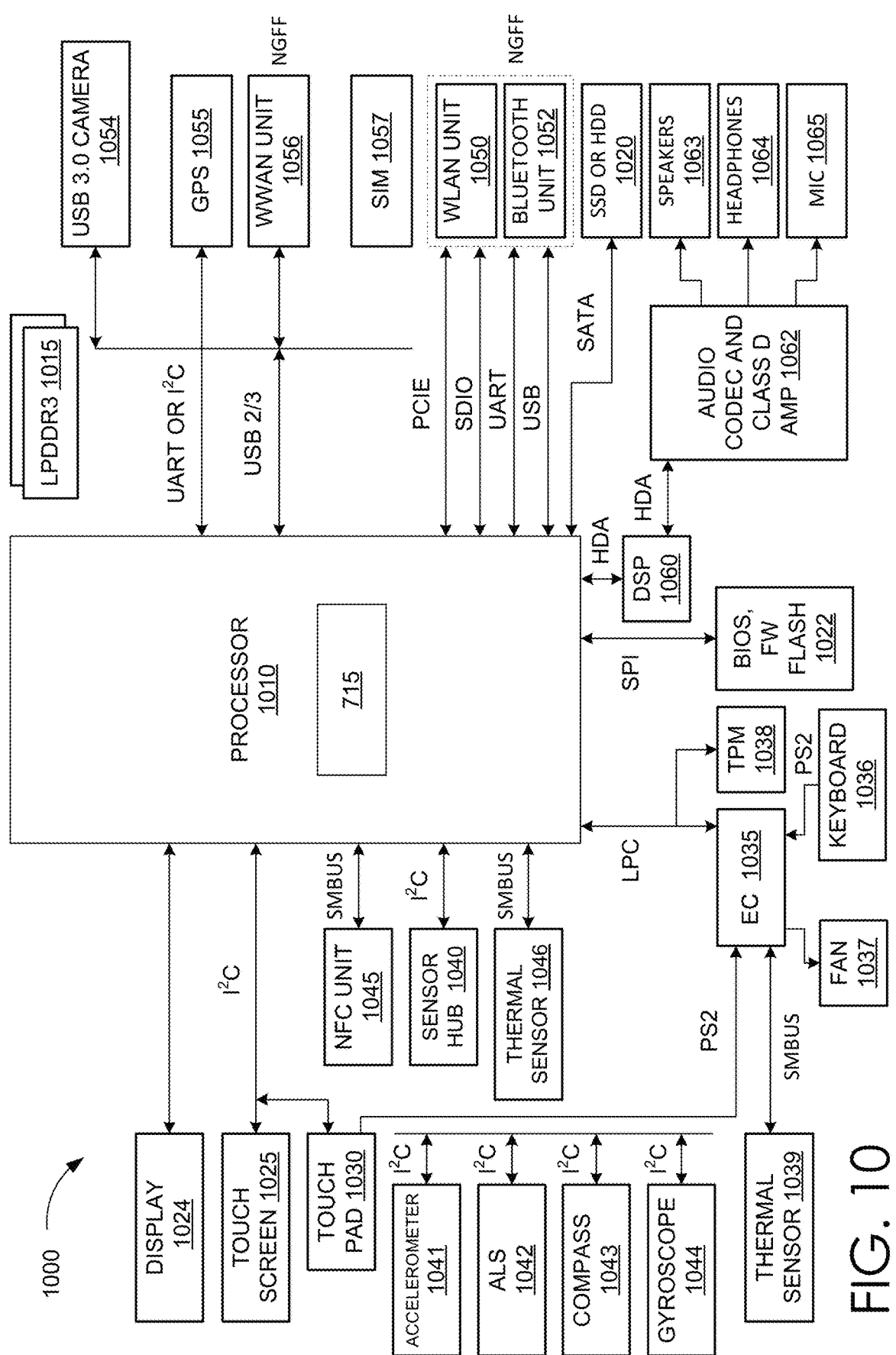
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, an USB (versions 1, 2, 3), or an Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary SOC. In at least one embodiment, devices illustrated in FIG. 10 may be interconnected with proprietary interconnects, standardized interconnects (for example, PCIe) or some combination thereof. In at least one embodiment, one or more components of FIG. 10 are interconnected using CXL interconnects.

In at least one embodiment, FIG. 10 may include a display 1024, a touch screen 1025, a touch pad 1030, a Near Field Communications ("NFC") unit 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network ("WLAN") unit 1050, a Bluetooth unit 1052, a Wireless Wide Area Network ("WWAN") unit 1056, a Global Positioning System ("GPS") 1055, a camera ("USB 3.0 camera") 1054 such as an USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to efficiently determine alpha blending values for objects that may have at least one sub-pixel dimension but are to be accurately represented in generated image content.

Figure 11:
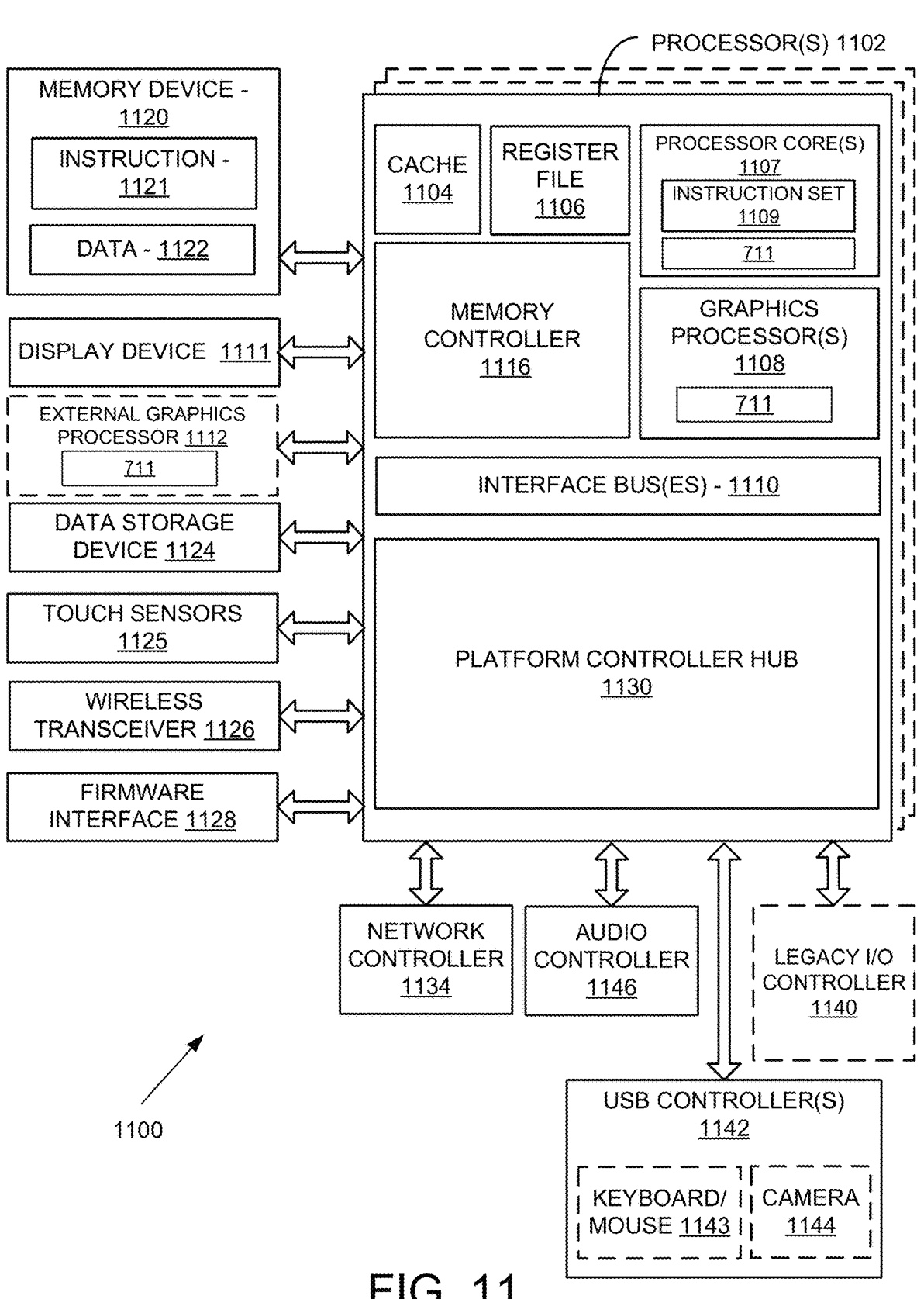
FIG. 11 illustrates at least portions of a graphics processor, according to one or more embodiments.

FIG. 11 is a block diagram of a processing system, according to at least one embodiment. In at least one embodiment, system 1100 includes one or more processor(s)

1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a SoC integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, system 1100 can also include, coupled with, or be integrated within a wearable device, such as a smart watch wearable device, smart eyewear device, AR device, or VR device. In at least one embodiment, system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate CISC, RISC, or computing via a VLIW. In at least one embodiment, processor core(s) 1107 may each process a different instruction set 1109, which may include instructions to facilitate emulation of other instruction sets. In at least one embodiment, processor core(s) 1107 may also include other processing devices, such a DSP.

In at least one embodiment, processor(s) 1102 includes cache memory ("cache") 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (for example, a Level-3 ("L3") cache or Last Level Cache ("LLC")) (not shown), which may be shared among processor core(s) 1107 using known cache coherency techniques. In at least one embodiment, register file 1106 is additionally included in processor(s) 1102 which may include different types of registers for storing different types of data (for example, integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface ("DMI") bus. In at least one embodiment, interface bus(es) 1110 is not limited to a DMI bus, and may include one or more Peripheral Component Interconnect buses (for example, PCI, PCI Express), memory buses, or other types of interface buses. In at least one embodiment processor(s) 1102 include an integrated memory controller 1116 and a platform controller hub ("PCH") 1130. In at least one embodiment, memory controller 1116 facilitates communication between a memory device 1120 and other components of system 1100, while PCH 1130 provides connections to I/O devices via a local I/O bus.

In at least one embodiment, memory device 1120 can be a DRAM device, a SRAM device, a flash memory device, a phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (for example, DisplayPort, etc.). In at least one embodiment, display device 1111 can include a head mounted display ("HMD") such as a stereoscopic display device for use in VR applications or AR applications.

In at least one embodiment, PCH 1130 allows peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (for example, a hard disk drive, a flash memory, etc.). In at least one embodiment, data storage device 1124 can connect via a storage interface (for example, SATA) or via a peripheral bus, such as a Peripheral Component Interconnect bus (for example, PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution ("LTE") transceiver. In at least one embodiment, firmware interface 1128 allows communication with system firmware, and can be, for example, a unified extensible firmware interface ("UEFI"). In at least one embodiment, network controller 1134 can allow a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (for example, Personal System 2 ("PS/2")) devices to system. In at least one embodiment, PCH 1130 can also connect to one or more USB controllers 1142 connect input devices, such as keyboard and mouse 1143 combinations, a camera 1144, or other USB input devices.

In at least one embodiment, an instance of memory controller 1116 and PCH 1130 may be integrated into a discreet external graphics processor, such as external graphics processor 1112. In at least one embodiment, PCH 1130 and/or memory controller 1116 may be external to one or more processor(s) 1102. For example, in at least one embodiment, system 1100 can include an external memory controller 1116 and PCH 1130, which may be configured as a MCH and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALU(s) embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of a graphics processor to perform one or more machine learning algorithms, neural network architectures, use cases, or training techniques described herein.

Such components can be used to efficiently determine alpha blending values for objects that may have at least one sub-pixel dimension but are to be accurately represented in generated image content.

Figure 12:
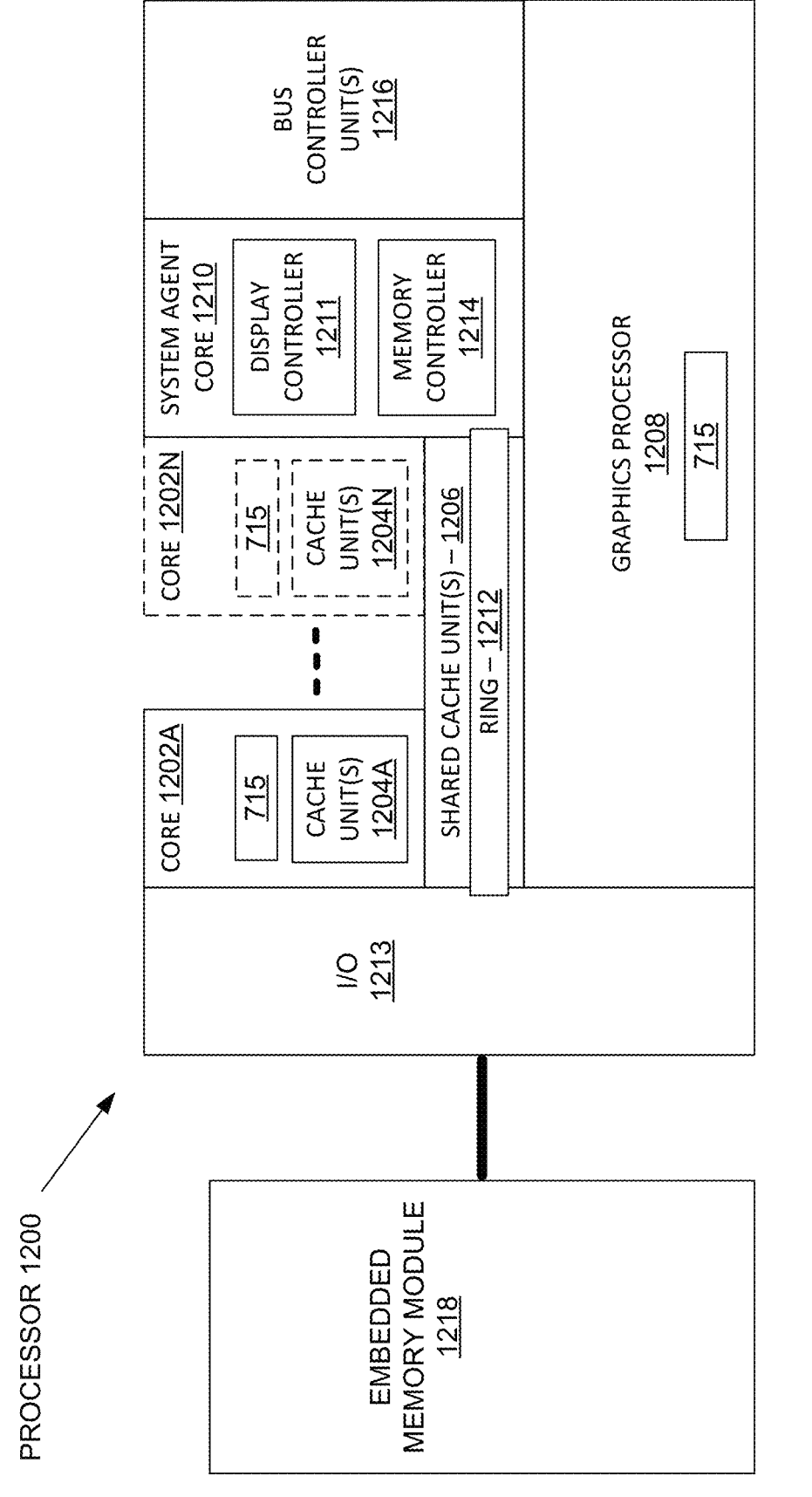
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache memory unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express buses. In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit ("PCU"), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture ("ISA"), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as a SOC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALU(s) embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALU(s) of graphics processor 1200 to perform one or more machine learning algorithms, neural network architectures, use cases, or training techniques described herein.

Such components can be used to efficiently determine alpha blending values for objects that may have at least one sub-pixel dimension but are to be accurately represented in generated image content.

Virtualized Computing Platform

Figure 13:
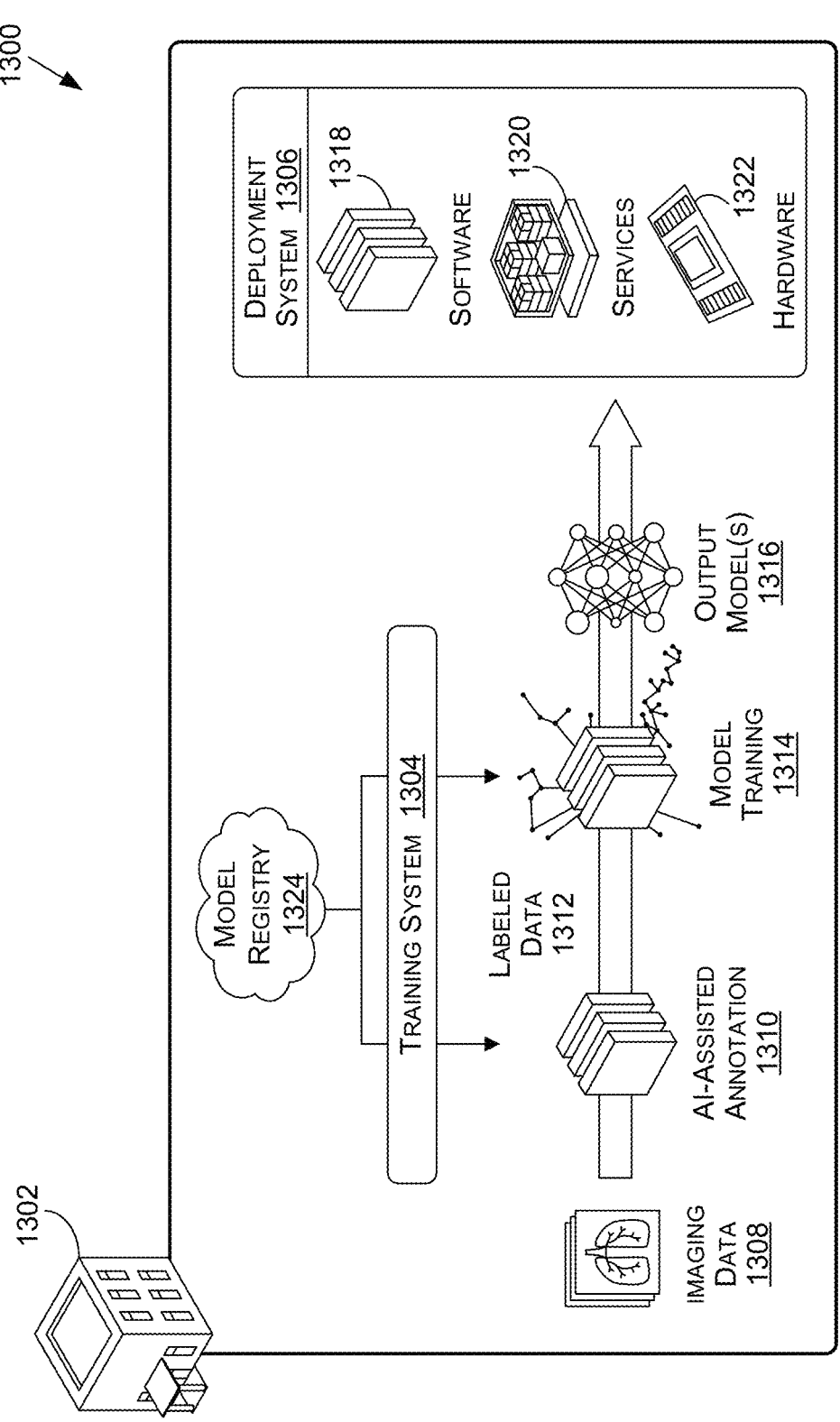
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (for example, neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (for example, inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system ("PACS") servers at facility(ies) 1302), may be trained using imaging or sequencing data 1308 from another facility(ies) 1302, or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface ("API") from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (for example, convolutional neural networks ("CNNs")) that may be trained to generate annotations corresponding to certain types of imaging data 1308 (for example, from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (for example, facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility(ies) 1302 requiring a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314 (for example, AI-assisted annotation 1310, labeled clinic data 1312, or a combination thereof) may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (for example, inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility(ies) 1302 after processing through a pipeline (for example, to convert outputs back to a usable data type). In at least one embodiment, a combination of containers within software 1318 (for example, that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (for example, imaging data 1308) in a specific format in response to an inference request (for example, a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (for example, as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (for example, limited access) area of a container registry (described in more detail herein), and trained or deployed models may be stored in model registry 1324 and associated with one or more applications. In at least one embodiment, images of applications (for example, container images) may be available in a container registry, and once selected by a user from a container registry for deployment in a pipeline, an image may be used to generate a container for an instantiation of an application for use by a user's system.

In at least one embodiment, developers (for example, software developers, clinicians, doctors, etc.) may develop, publish, and store applications (for example, as containers) for performing image processing and/or inferencing on supplied data. In at least one embodiment, development, publishing, and/or storing may be performed using a software development kit ("SDK") associated with a system (for example, to ensure that an application and/or container developed is compliant with or compatible with a system). In at least one embodiment, an application that is developed may be tested locally (for example, at a first facility, on data from a first facility) with a SDK which may support at least some of services 1320 as a system (for example, processor 1200 of FIG. 12). In at least one embodiment, because DICOM objects may contain anywhere from one to hundreds of images or other data types, and due to a variation in data, a developer may be responsible for managing (for example, setting constructs for, building pre-processing into an application, etc.) extraction and preparation of incoming data. In at least one embodiment, once validated by process 1300 (for example, for accuracy), an application may be available in a container registry for selection and/or implementation by a user to perform one or more processing tasks with respect to data at a facility (for example, a second facility) of a user.

In at least one embodiment, developers may then share applications or containers through a network for access and use by users of a system (for example, process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (for example, a cloud) to perform processing of data processing pipeline. In at least one embodiment, processing by deployment system 1306 may include referencing selected elements (for example, applications, containers, models, etc.) from a container registry and/or model registry 1324. In at least one embodiment, once results are generated by a pipeline, results may be returned to a user for reference (for example, for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, AI services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (for example, using a parallel computing platform). In at least one embodiment, rather than each application that shares a same functionality offered by services 1320 being required to have a respective instance of services 1320, services 1320 may be shared between and among various applications. In at least one embodiment, services 1320 may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (for example, DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional ("2D") and/or 3D models. In at least one embodiment, virtual instrument services may be included that provide for beam-forming, segmentation, inferencing, imaging, and/or support for other applications within pipelines of virtual instruments.

In at least one embodiment, where services 1320 includes an AI service (for example, an inference service), one or more machine learning models may be executed by calling upon (for example, as an API call) an inference service (for example, an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (for example, an AI supercomputer, such as NVIDIA's DGX Systems), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (for example, at facility(ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (for example, hardware and software combination of NVIDIA's DGX Systems). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (for example, NVIDIA's NGC) may be executed using an AI/deep learning supercomputer(s) and/or GPU-optimized software (for example, as provided on NVIDIA's DGX Systems) as a hardware abstraction and scaling platform. In at least one embodiment, cloud platform may integrate an application container clustering system or orchestration system (for example, KUBERNETES) on multiple GPUs to allow seamless scaling and load balancing.

Figure 14:
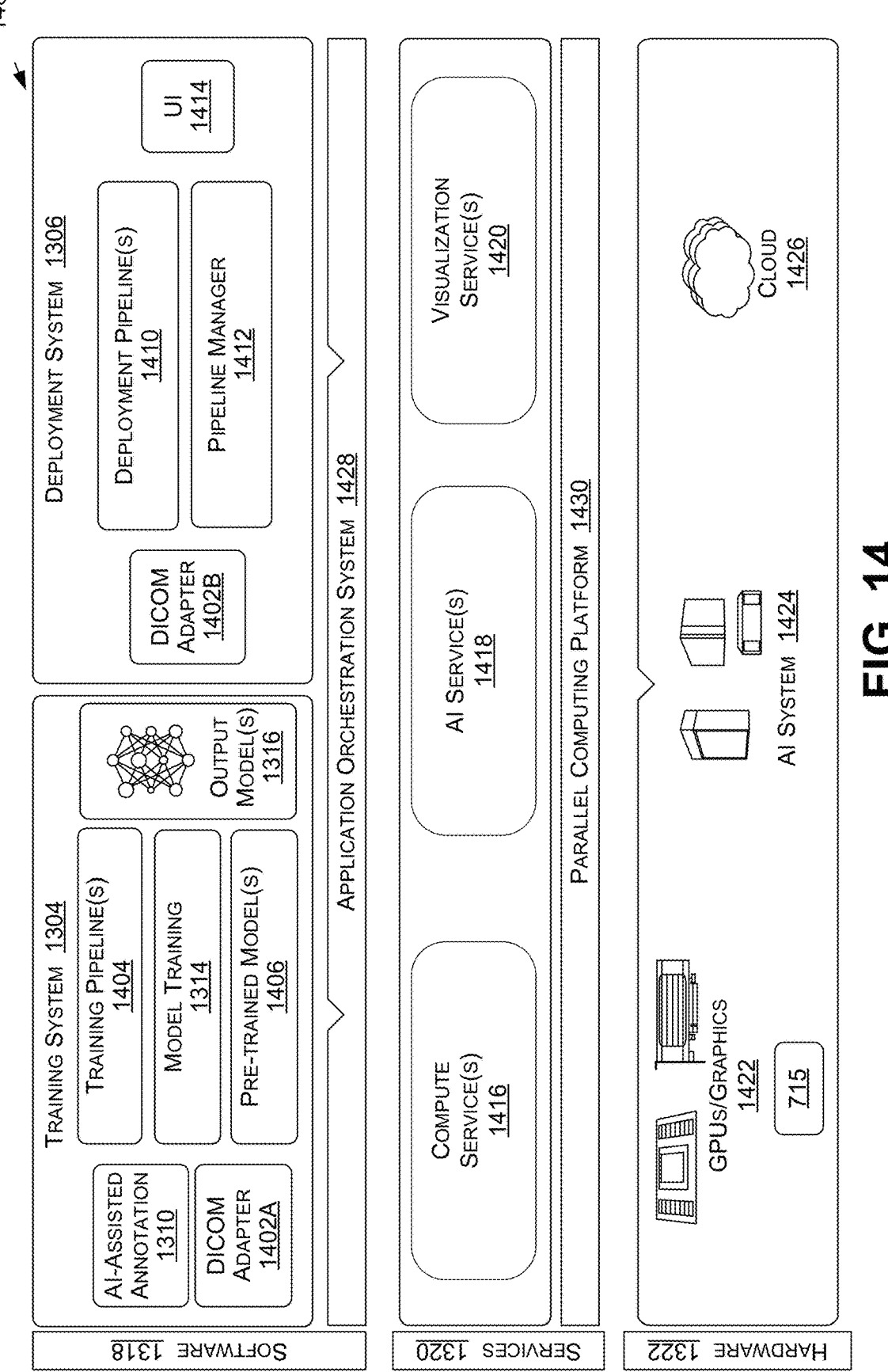
FIG. 14 is a system diagram for an example system for training, adapting, instantiating, and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (for example, training system 1304 and/or deployment system 1306) may implemented in a cloud computing environment (for example, using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (for example, AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to LANs and/or WANs via wired and/or wireless communication protocols. In at least one embodiment, communication between facilities and components of system 1400 (for example, for transmitting inference requests, for receiving results of inference requests, etc.) may be communicated over data bus(ses), wireless data protocols (Wi-Fi), wired data protocols (for example, Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (for example, pre-trained) models, and/or implement one or more of pre-trained model(s) 1406 (for example, without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines ("SVM"), Naïve Bayes, k-nearest neighbor ("Knn"), K means clustering, random forest, dimensionality reduction algorithms, gradient boosting algorithms, neural networks (for example, auto-encoders, convolutional, recurrent, perceptrons, Long/Short Term Memory ("LSTM"), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (for example, traditional annotation) may be generated by any number of techniques. In at least one embodiment, labels or other annotations may be generated within a drawing program (for example, an annotation program), a computer aided design ("CAD") program, a labeling program, another type of program suitable for generating annotations or labels for ground truth, and/or may be hand drawn, in some examples. In at least one embodiment, ground truth data may be synthetically produced (for example, generated from computer models or renderings), real produced (for example, designed and produced from real-world data), machine-automated (for example, using feature analysis and learning to extract features from data and then generate labels), human annotated (for example, labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipeline(s) 1410; either in addition to, or in lieu of AI-assisted annotation 1310 included in training pipeline(s) 1404. In at least one embodiment, system 1400 may include a multi-layer platform that may include a software layer (for example, software 1318) of diagnostic applications (or other application types) that may perform one or more medical imaging and diagnostic functions. In at least one embodiment, system 1400 may be communicatively coupled to (for example, via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (for example, called) from an external environment(s) (for example, facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (for example, a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (for example, a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (for example, Kubernetes, DOCKER, etc.) may include a container orchestration system that may group applications into containers as logical units for coordination, management, scaling, and deployment. In at least one embodiment, by associating applications from deployment pipeline(s) 1410 (for example, a reconstruction application, a segmentation application, etc.) with individual containers, each application may execute in a self-contained environment (for example, at a kernel level) to increase speed and efficiency.

In at least one embodiment, each application and/or container (or image thereof) may be individually developed, modified, and deployed (for example, a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (for example, based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (for example, user constraints), such as quality of service (QOS), urgency of need for data outputs (for example, to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (for example, execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (for example, using a parallel computing platform 1430) for processing data through one or more of applications and/or one or more tasks of a single application, substantially simultaneously. In at least one embodiment, parallel computing platform 1430 (for example, NVIDIA's CUDA) may allow general purpose computing on GPUs ("GPGPU") (for example, GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (for example, where multiple different stages of an application or multiple applications are processing same information). In at least one embodiment, rather than making a copy of data and moving data to different locations in memory (for example, a read/write operation), same data in same location of a memory may be used for any number of processing tasks (for example, at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (for example, tasked with performing one or more processing tasks of an application). In at least one embodiment, AI service(s) 1418 may leverage AI system 1424 to execute machine learning model(s) (for example, neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (for example, a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (for example, services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (for example, for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (for example, shared storage), and/or a copy of a model may be saved to a cache. In at least one embodiment, a scheduler (for example, of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (for example, hosting an instance of an inference server) may be loaded (if not already), and a start procedure may be called. In at least one embodiment, pre-processing logic in a container may load, decode, and/or perform any additional pre-processing on incoming data (for example, using a CPU(s) and/or GPU(s)). In at least one embodiment, once data is prepared for inference, a container may perform inference as necessary on data. In at least one embodiment, this may include a single inference call on one image (for example, a hand X-ray), or may require inference on hundreds of images (for example, a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (for example, TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a SDK, and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, VR displays, AR displays, etc. In at least one embodiment, virtualized environments may be used to generate a virtual interactive display or environment (for example, a virtual environment) for interaction by users of a system (for example, doctors, nurses, radiologists, etc.). In at least one embodiment, visualization service(s) 1420 may include an internal visualizer, cinematics, and/or other rendering or image processing capabilities or functionality (for example, ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (for example, NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (for example, to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (for example, a supercomputer or an HPC) configured for inferencing, deep learning, machine learning, and/or other AI tasks. In at least one embodiment, AI system 1424 (for example, NVIDIA's DGX Systems) may include GPU-optimized software (for example, a software stack) that may be executed using a plurality of GPUs/Graph 1422, in addition to CPUs, RAM, storage, and/or other components, features, or functionality. In at least one embodiment, one or more AI systems 1424 may be implemented in cloud 1426 (for example, in a data center) for performing some or all of AI-based processing tasks of system 1400.

In at least one embodiment, cloud 1426 may include a GPU-accelerated infrastructure (for example, NVIDIA's NGC) that may provide a GPU-optimized platform for executing processing tasks of system 1400. In at least one embodiment, cloud 1426 may include an AI system(s) 1424 for performing one or more of AI-based tasks of system 1400 (for example, as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (for example, executing NVIDIA's TENSOR RT), provide a parallel computing platform 1430 (for example, NVIDIA's CUDA), execute application orchestration system 1428 (for example, KUBERNETES), provide a graphics rendering API and platform (for example, for ray-tracing, 2D graphics, 3D graphics, and/or other rendering techniques to produce higher quality cinematics), and/or may provide other functionality for system 1400.

Figure 15A:
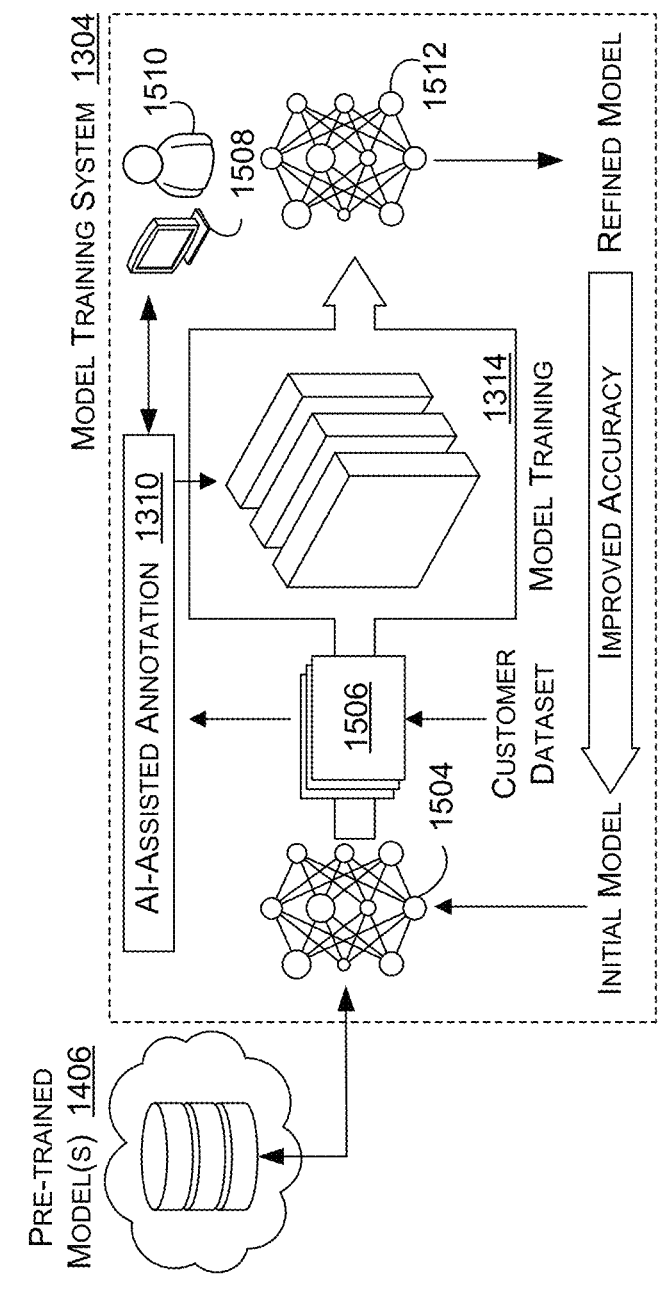
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1500 of FIG. 15A. In at least one embodiment, process 1500 may leverage services and/or hardware as described herein. In at least one embodiment, refined model 1512 generated by process 1500 may be executed by a deployment system for one or more containerized applications in deployment pipelines.

In at least one embodiment, model training 1514 may include retraining or updating an initial model 1504 (for example, a pre-trained model) using new training data (for example, new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (for example, weights and/or biases) that remain from prior training, so training or retraining may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1406 may be stored in a data store, or registry. In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using a cloud and/or other hardware, but confidential, privacy protected patient data may not be transferred to, used by, or accessible to any components of a cloud (or other off premise hardware). In at least one embodiment, where pre-trained models 1406 is trained at using patient data from more than one facility, pre-trained models 1406 may have been individually trained for each facility prior to being trained on patient or customer data from another facility. In at least one embodiment, such as where a customer or patient data has been released of privacy concerns (for example, by waiver, for experimental use, etc.), or where a customer or patient data is included in a public data set, a customer or patient data from any number of facilities may be used to train pre-trained models 1406 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained model(s) 1406 to use with an application. In at least one embodiment, pre-trained model may not be optimized for generating accurate results on customer dataset 1506 of a facility of a user (for example, based on patient diversity, demographics, types of medical imaging devices used, etc.). In at least one embodiment, prior to deploying a pre-trained model into a deployment pipeline for use with an application(s), pre-trained model(s) 1406 may be updated, retrained, and/or fine-tuned for use at a respective facility.

In at least one embodiment, a user may select pre-trained model(s) 1406 that is to be updated, retrained, and/or fine-tuned, and this pre-trained model may be referred to as initial model 1504 for a training system within process 1500. In at least one embodiment, a customer dataset 1506 (for example, imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by model training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (for example, implemented using an AI-assisted annotation SDK) may leverage machine learning models (for example, neural networks) to generate suggested or predicted ground truth data for a customer dataset. In at least one embodiment, a user may use annotation tools within a user interface (a GUI) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (for example, from AI-assisted annotation 1310, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained model(s) 1542 in a model registry to be selected by another facility. In at least one embodiment, this process may be completed at any number of facilities such that refined model 1512 may be further refined on new datasets any number of times to generate a more universal model.

Figure 15B:
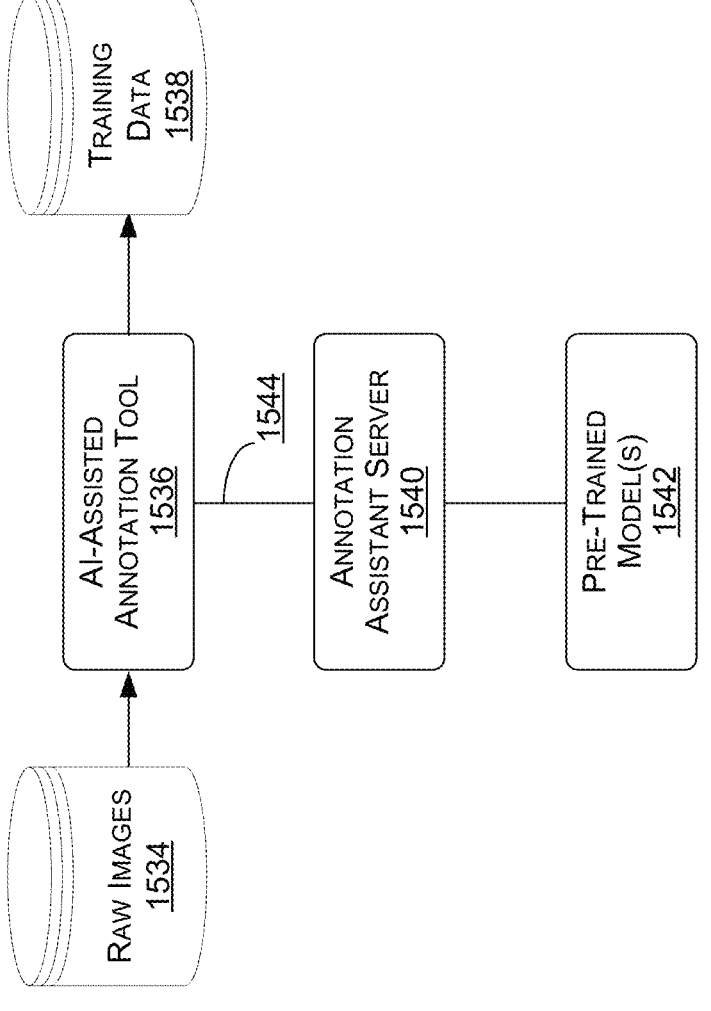

FIG. 15B is an example illustration of a client-server architecture 1532 to enhance annotation tools with pre-trained model(s) 1542, in accordance with at least one embodiment. In at least one embodiment, AI-assisted annotation tool 1536 may be instantiated based on a client-server architecture 1532. In at least one embodiment, AI-assisted annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (for example, in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (for example, API Call 1544) to a server, such as an annotation assistant server 1540 that may include a set of pre-trained model(s) 1542 stored in an annotation model registry, for example. In at least one embodiment, an annotation model registry may store pre-trained model(s) 1542 (for example, machine learning models, such as deep learning models) that are pre-trained to perform AI-assisted annotation 1310 on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
identifying, for an image to be rendered of a scene, a curve equation approximating an object in the scene;
determining one or more pixel locations, of the image to be rendered, that include a portion of a curve determined according to the curve equation and having a width greater than a specified width corresponding to the object;

performing ray tracing for the determined pixel locations to identify one or more pixels in which a traced ray intersects the object;
determining, for individual pixels in which the traced ray intersects the object, a geometric shape approximating a portion of the object represented within a pixel boundary of the pixel at the respective pixel location; and
blending a pixel value of the object with a background value for the individual pixels according to one or more blending weights determined for the respective pixel locations, wherein individual blending weights correspond to a fraction or percentage of the area of the respective pixel that is occupied by the portion of the object.

2. The computer-implemented method of clause 1, wherein the curve equation is approximated using a line segment within a pixel boundary of a pixel in which the traced ray intersects the object.

3. The computer-implemented method of clause 2, wherein the line segment is represented within a pixel boundary using two linear edges derived using a hit normal of the curve within the pixel boundary and the specified width.

4. The computer-implemented method of clause 3, wherein the geometric shape is determined in part by identifying one or more intersection points of the two linear edges of the line segment, having the specified width, with the pixel boundary, and identifying one or more vertices of the pixel boundary contained within the line segment.

5. The computer-implemented method of clause 1, wherein the object having a specified width is at least one of: a hair, a fiber, a thread, a blade of grass, a string, an antenna, or a bristle.

6. The computer-implemented method of clause 1, wherein the specified width of the object is less than a width of one pixel of the image to be rendered, and wherein the width greater than the specified width is equal to at least the width of one pixel of the image to be rendered.

7. The computer-implemented method of clause 1, wherein the curve equation identified, for at least one pixel location of the image to be rendered, corresponds to the object that is closest to a virtual camera with respect to a view for the at least one pixel location.

8. A processor, comprising:
one or more circuits to:
identify, for an image to be rendered of a scene, a curve equation approximating an object in the scene;
determine one or more pixel locations, of the image to be rendered, that include a portion of a curve determined according to the curve equation and having a width greater than a specified width corresponding to the object;
perform ray tracing for the determined pixel locations to identify one or more pixels in which a traced ray intersects the object;
determine, for individual pixels in which the traced ray intersects the object, a geometric shape approximating a portion of the object represented within a pixel boundary of the pixel at the respective pixel location; and
blend a pixel value of the object with a background value for the individual pixels according to one or more blending weights determined for the respective pixel locations, wherein individual blending weights correspond to a fraction or percentage of the area of the respective pixel that is occupied by the portion of the object.

9. The processor of clause 8, wherein the curve equation is approximated using a line segment within a pixel boundary of a pixel in which the traced ray intersects the object.

10. The processor of clause 9, wherein the line segment is represented within a pixel boundary using two linear edges derived using a hit normal of the curve within the pixel boundary and the specified width.

11. The processor of clause 8, wherein the geometric shape is determined in part by identifying one or more intersection points of the two linear edges of the line segment, having the specified width, with the pixel boundary, and identifying one or more vertices of the pixel boundary contained within the line segment.

12. The processor of clause 8, wherein the specified width of the object is less than the width of one pixel of the image to be rendered, and wherein the width greater than the specified width is equal to at least the width of one pixel of the image to be rendered.

13. The processor of clause 8, wherein the curve equation identified, for at least one pixel location of the image to be rendered, corresponds to the object that is closest to a virtual camera with respect to a view for the at least one pixel location.

14. The processor of clause 8, wherein the processor is comprised in at least one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system implemented at least partially in a data center;
  a system for performing hardware testing using simulation;
  a system for synthetic data generation;
  a system for performing generative AI operations using a large language model (LLM),
  a collaborative content creation platform for 3D assets; or
  a system implemented at least partially using cloud computing resources.

15. A system, comprising:
  one or more processors to determine one or more blending weights for individual pixels of an image including a representation of a portion of an object approximated by a curve equation, the one or more processors to perform ray tracing for a first set of pixels identified using a curve determined according to the curve equation and having an increased width, the one or more blending weights being determined for a second set of pixels in which traced rays are determined to intersect the elongated object, the one or more blending weights corresponding to a portion of the individual pixels occupied by a geometric representation of a portion of the object contained within the bounds of the respective pixels.

16. The system of clause 15, wherein the curve equation is approximated using a line segment within a pixel boundary of a pixel in which the traced ray intersects the object.

17. The system of clause 16, wherein the line segment is represented within a pixel boundary using two linear edges derived using a hit normal of the curve within the pixel boundary and the increased width.

18. The system of clause 15, wherein the geometric representation is determined in part by identifying one or more intersection points of the two linear edges of the line segment with the pixel boundary, and identifying one or more vertices of the pixel boundary contained within the line segment.

19. The system of clause 15, wherein at least one dimension of the object is less than the width of one pixel of the image to be rendered, and wherein the increased width is equal to at least the width of one pixel of the image to be rendered.

20. The system of clause 15, wherein the system comprises at least one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system for performing generative AI operations using a large language model (LLM),
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system implemented at least partially in a data center;
  a system for performing hardware testing using simulation;
  a system for synthetic data generation;
  a collaborative content creation platform for 3D assets; or
  a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (for example, "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (for example, "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (for example, executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (for example, a propagating transient electric or electromagnetic transmission) but includes non-transitory data storage circuitry (for example, buffers, cache, and queues) within transceivers of transitory signals. In at least one embodiment, code (for example, executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main CPU executes some of instructions while a GPU executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (for example, "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an API or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
identifying, for an image to be rendered of a scene, a curve equation approximating an object in the scene;
determining one or more pixel locations, of the image to be rendered, that include a portion of a curve determined according to the curve equation and having a width greater than a specified width corresponding to the object;
performing ray tracing for the determined pixel locations to identify one or more pixels in which a traced ray intersects the object;
determining, for individual pixels in which the traced ray intersects the object, a geometric shape approximating a portion of the object represented within a pixel boundary of the pixel at the respective pixel location; and
blending a pixel value of the object with a background value for the individual pixels according to one or more blending weights determined for the respective pixel locations, wherein individual blending weights correspond to a fraction or percentage of an area of the respective pixel that is occupied by the portion of the object.

2. The computer-implemented method of claim 1, wherein the curve equation is approximated using a line segment within a pixel boundary of a pixel in which the traced ray intersects the object.

3. The computer-implemented method of claim 2, wherein the line segment is represented within a pixel boundary using two linear edges derived using a hit normal of the curve within the pixel boundary and the specified width.

4. The computer-implemented method of claim 3, wherein the geometric shape is determined in part by identifying one or more intersection points of the two linear edges of the line segment, having the specified width, with the pixel boundary, and identifying one or more vertices of the pixel boundary contained within the line segment.

5. The computer-implemented method of claim 1, wherein the object having a specified width is at least one of: a hair, a fiber, a thread, a blade of grass, a string, an antenna, or a bristle.

6. The computer-implemented method of claim 1, wherein the specified width of the object is less than a width of one pixel of the image to be rendered, and wherein the width greater than the specified width is equal to at least the width of one pixel of the image to be rendered.

7. The computer-implemented method of claim 1, wherein the curve equation identified, for at least one pixel location of the image to be rendered, corresponds to the object that is closest to a virtual camera with respect to a view for the at least one pixel location.

8. A processor, comprising:
one or more circuits to:
identify, for an image to be rendered of a scene, a curve equation approximating an object in the scene;
determine one or more pixel locations, of the image to be rendered, that include a portion of a curve determined according to the curve equation and having a width greater than a specified width corresponding to the object;
perform ray tracing for the determined pixel locations to identify one or more pixels in which a traced ray intersects the object;
determine, for individual pixels in which the traced ray intersects the object, a geometric shape approximating a portion of the object represented within a pixel boundary of the pixel at the respective pixel location; and
blend a pixel value of the object with a background value for the individual pixels according to one or more blending weights determined for the respective pixel locations, wherein individual blending weights correspond to a fraction or percentage of an area of the respective pixel that is occupied by the portion of the object.

9. The processor of claim 8, wherein the curve equation is approximated using a line segment within a pixel boundary of a pixel in which the traced ray intersects the object.

10. The processor of claim 9, wherein the line segment is represented within a pixel boundary using two linear edges derived using a hit normal of the curve within the pixel boundary and the specified width.

11. The processor of claim 10, wherein the geometric shape is determined in part by identifying one or more intersection points of the two linear edges of the line segment, having the specified width, with the pixel boundary, and identifying one or more vertices of the pixel boundary contained within the line segment.

12. The processor of claim 8, wherein the specified width of the object is less than the width of one pixel of the image to be rendered, and wherein the width greater than the specified width is equal to at least the width of one pixel of the image to be rendered.

13. The processor of claim 8, wherein the curve equation identified, for at least one pixel location of the image to be rendered, corresponds to the object that is closest to a virtual camera with respect to a view for the at least one pixel location.

14. The processor of claim 8, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a system for performing generative AI operations using a large language model (LLM), a collaborative content creation platform for 3D assets; or a system implemented at least partially using cloud computing resources.

15. A system, comprising:

one or more processors to determine one or more blending weights for individual pixels of an image including a representation of a portion of an object approximated by a curve equation, the one or more processors to perform ray tracing for a first set of pixels identified using a curve determined according to the curve equation and having an increased width, the one or more blending weights being determined for a second set of pixels in which traced rays are determined to intersect the object, the one or more blending weights corresponding to a portion of the individual pixels occupied by a geometric representation of a portion of the object contained within bounds of the respective pixels.

16. The system of claim 15, wherein the curve equation is approximated using a line segment within a pixel boundary of a pixel in which the traced ray intersects the object.

17. The system of claim 16, wherein the line segment is represented within a pixel boundary using two linear edges derived using a hit normal of the curve within the pixel boundary and the increased width.

18. The system of claim 17, wherein the geometric representation is determined in part by identifying one or more intersection points of the two linear edges of the line segment with the pixel boundary, and identifying one or more vertices of the pixel boundary contained within the line segment.

19. The system of claim 15, wherein at least one dimension of the object is less than the width of one pixel of the image to be rendered, and wherein the increased width is equal to at least the width of one pixel of the image to be rendered.

20. The system of claim 15, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system for performing generative AI operations using a large language model (LLM), a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

* * * * *